United States Patent
Kannamparambil et al.

(10) Patent No.: US 10,157,057 B2
(45) Date of Patent: Dec. 18, 2018

(54) METHOD AND APPARATUS OF SEGMENT FLOW TRACE ANALYSIS

(71) Applicant: Syntel, Inc., Troy, MI (US)

(72) Inventors: Raveendran Kannamparambil, Chennai (IN); Bobby Sharma, Memphis, TN (US); Casimir Zephrine Antony Samy, Chennai (IN)

(73) Assignee: Syntel, Inc., Troy, MI (US)

( * ) Notice: Subject to any disclaimer, the term of this patent is extended or adjusted under 35 U.S.C. 154(b) by 0 days.

(21) Appl. No.: 15/664,532

(22) Filed: Jul. 31, 2017

(65) Prior Publication Data

US 2018/0032328 A1 Feb. 1, 2018

Related U.S. Application Data

(60) Provisional application No. 62/369,378, filed on Aug. 1, 2016.

(51) Int. Cl.
  *G06F 8/75* (2018.01)
  *G06F 9/44* (2018.01)
(52) U.S. Cl.
  CPC .................................. *G06F 8/75* (2013.01)
(58) Field of Classification Search
  CPC ......................................................... G06F 8/75
  USPC ........................................................ 717/123
  See application file for complete search history.

(56) References Cited

U.S. PATENT DOCUMENTS

| 4,455,619 | A | * | 6/1984 | Masui | G05B 19/056 |
|---|---|---|---|---|---|
| | | | | | 345/530 |
| 4,903,199 | A | | 2/1990 | Keenan et al. | |
| 5,129,046 | A | | 7/1992 | Tanabe et al. | |
| 5,371,747 | A | | 12/1994 | Brooks et al. | |
| 5,446,911 | A | * | 8/1995 | Juso | G06F 8/75 |
| | | | | | 717/123 |
| 5,504,902 | A | | 4/1996 | McGrath et al. | |
| 5,555,419 | A | | 9/1996 | Arsenault | |
| 5,689,684 | A | * | 11/1997 | Mulchandani | G06F 9/4411 |
| | | | | | 703/23 |
| 5,991,874 | A | | 11/1999 | Mills et al. | |
| 6,016,556 | A | | 1/2000 | Heath | |

(Continued)

OTHER PUBLICATIONS

Ammons et al., "Improving Data-flow Analysis with Path Profiles", ACM, 1998, 13pg. (Year: 1998).*

(Continued)

*Primary Examiner* — Ryan D. Coyer
(74) *Attorney, Agent, or Firm* — Dykema Gossett PLLC

(57) ABSTRACT

A method and apparatus for assembler source code analysis may include selecting assembler source code, parsing the assembler source code, determining the presence of predetermined assembler macros, recording the present assembler macros and the programs containing the predetermined assembler macros in a macro data table, and processing the macro data table to generate a text report and/or a graphical flow diagram. The method may include simulating memory to execute the assembler source code and tracing the flow of the assembler source code and the predetermined assembler macros. The method may include tracing the flow of the assembler source code in a comprehensive, forward, or reverse flow, and generating resulting text reports and/or graphical flow diagrams.

9 Claims, 15 Drawing Sheets

(56) References Cited

U.S. PATENT DOCUMENTS

| | | | |
|---|---|---|---|
| 6,611,909 B1* | 8/2003 | Roos | G06F 9/261 712/211 |
| 6,983,453 B2 | 1/2006 | Strait et al. | |
| 7,302,676 B2 | 11/2007 | Schmitt et al. | |
| 7,337,438 B1* | 2/2008 | Dobbins | G06F 8/425 717/141 |
| 7,392,514 B2 | 6/2008 | Edwards | |
| 8,146,055 B2 | 3/2012 | Bhandari et al. | |
| 8,745,591 B2 | 6/2014 | De Smet et al. | |
| 2006/0053414 A1 | 3/2006 | Bhandari et al. | |
| 2006/0143594 A1* | 6/2006 | Grimaldi | G06F 8/73 717/123 |
| 2007/0006155 A1 | 1/2007 | Maennel et al. | |
| 2007/0271553 A1* | 11/2007 | Higgins | G06F 8/53 717/136 |
| 2015/0220333 A1* | 8/2015 | Soeder | G06F 8/75 717/123 |

OTHER PUBLICATIONS

Kastner et al., "Generic Control Flow Reconstruction from Assembly Code", ACM, 2002, 10pg. (Year: 2002).*

Yakdan et al., "No More Gotos: Decompilation Using Pattern-Independent Control-Flow Structuring and Semantics-Preserving Transformations", Internet Society, 2015, 15pg. (Year: 2015).* zTPFGI Supplement Tools & Enhancements Brochure by TPF Software, Inc. (16 pgs.).

TPF/GI Interactive Client/Server Testing for TPF Brochure by TPF Software, Inc., 2001 (6 pgs.).

zTTFS the z/TPF to z/TPF Function Server & Asynchronous Trace Brochure by TPF Software, Inc. (2 pgs.).

zTPFGI Suite, A Comprehensive Test Management System for z/TPF by TPF Software, Inc. (12 pgs.).

* cited by examiner

| User-Selected Program List | Initial Program Trace Status | Program Trace Status |
|---|---|---|
| AAAA | N | Y |
| BBBB | N | Y |
| CCCC | N | Y |
| DDDD | N | N |
| EEEE | N | N |

FIG. 14

| Calling Program Name (First Field) | Control Transfer Macro Name (Second Field) | Called Program Name (Third Field) |
|---|---|---|
| AAAA | ENTNC → | BBBB |
| BBBB ←→ | ENTRC ←→ | CCCC |
| BBBB | ENTNC → | DDDD |
|  |  |  |
| EEEE | ENTNC → | FFFF |

FIG. 15

METHOD AND APPARATUS OF SEGMENT FLOW TRACE ANALYSIS

CROSS-REFERENCE TO RELATED APPLICATIONS

This application claims the benefit of U.S. provisional application No. 62/369,378, filed 1 Aug. 2016 (the '378 application). The '378 application is hereby incorporated by reference as though fully set forth herein.

BACKGROUND a. Technical Field

The present disclosure relates generally to a method and apparatus for analyzing source code, and more particularly to a method and apparatus for segment flow tracing of assembler source code.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

There is a desire for assembler software developers in the Transaction Processing Facility (TPF) environment to analyze existing code during maintenance and/or program enhancements. Some challenges in analyzing code in the TPF environment may include understanding the basic logic instruction by instruction, and the flow of the existing code. The list of programs that are executed during a business transaction constitutes the segment flow. By tracing the segment flow of the code, software developers may improve their understanding of the transactions of the code. For each transaction, program or segment flow varies based on the actual work done by the transaction depending on the user input parameters.

There is, therefore, a need for solutions that allow the analysis of assembler source code, including segment flow tracing of assembler source code. The foregoing discussion is intended only to illustrate the present field and should not be taken as a disavowal of claim scope.

SUMMARY

In embodiments, a method and apparatus for assembler source code analysis may include selecting assembler source code, parsing the assembler source code, determining the presence of predetermined assembler macros, recording the present assembler macros and the programs containing the predetermined assembler macros in a macro data table, and processing the macro data table to generate a text report and/or a graphical flow diagram. The method may include simulating memory to execute the assembler source code and tracing the flow of the assembler source code and the predetermined assembler macros. The method may include tracing the flow of the assembler source code in a comprehensive, forward, or reverse flow, and generating resulting text reports and/or graphical flow diagrams. Other methods, systems, and apparatus descriptions and/or embodiments are also presented herein.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 14 is a table generally illustrating a user-selected program list and program trace status produced by the method and apparatus for segment flow analysis, in accordance with teachings of the present disclosure.

FIG. 15 is a table generally illustrating user-selected programs and control transfer macros produced by the method and apparatus for segment flow analysis, in accordance with teachings of the present disclosure.

DETAILED DESCRIPTION

Figure 1:
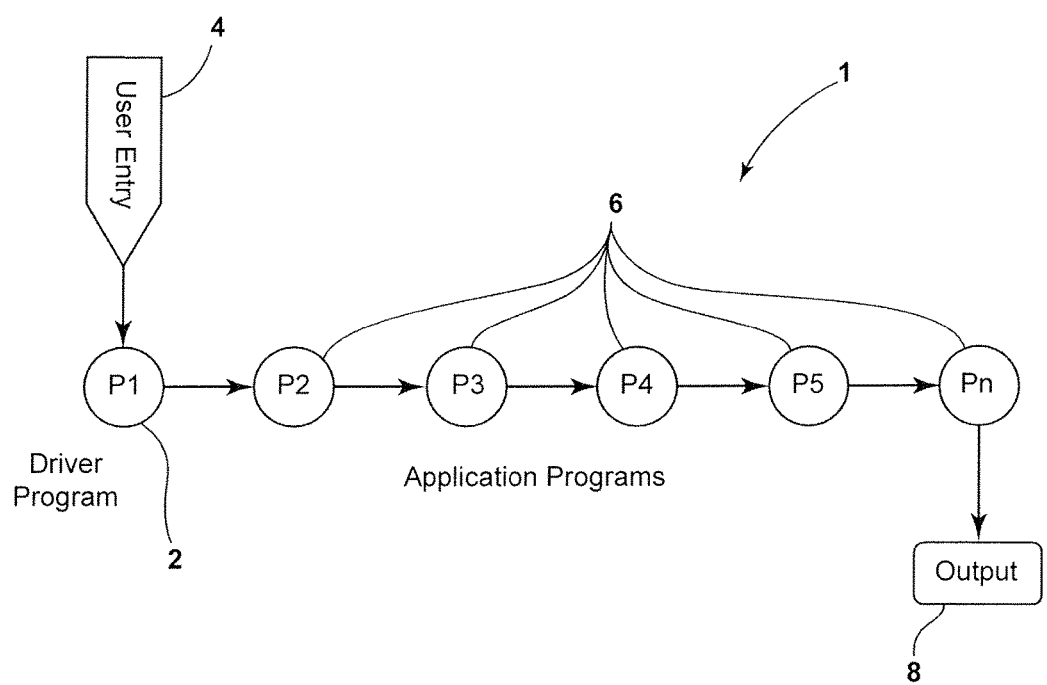
FIG. 1 is a flow diagram generally illustrating an embodiment of assembler source code for analysis by a segment flow analyzer tool in accordance with teachings of the present disclosure.

Transaction Processing Facility (TPF) is an International Business Machines, Inc. (IBM) mainframe operating system. It is designed for handling high volume mission critical business transactions which demand very high performance and availability. TPF is widely used in travel, hospitality and financial industries (airlines, railways, global distribution systems (GDS), hotels, credit card processing, etc.).

TPF systems were operational as early as the 1960s and currently have large number of business critical applications running by various organizations. Until 1990, all TPF applications were developed using IBM low level assembly language as there was no high level language support available. Even though high level languages were supported after the 1990s, because of performance and compatibility reasons, many TPF applications continued to be developed in assembler. Currently, about ninety percent of the total TPF application code is in assembly language. The latest version of TPF is called z/TPF (using 64 Bit z-architecture), and was released by IBM in 2005. Additionally, TPF does not support common industry standard database organizations like RDBMS or even IBM's own proprietary database such as DB2 or VSAM for storing the data. It uses a unique file management system called TPFDF, which is also tightly linked with assembly language for interface.

Whenever any business function is modified in a TPF application, as a first step in analysis, developers are required to identify all transactions existing for this function and the programs executed during each transaction (i.e., identify all affected programs and segment flow for further detailed analysis). The following are major options available to the TPF software developers currently for the analysis. The developers can study and understand the application documentation and obtain the required information for detailed analysis. Additionally, the developers can identify the transaction driver program (i.e., transaction driver program is the first application program executed during the transaction), and then manually analyze lines of code, one by one, to get the details of the other programs in the transaction flow (e.g., searching for ENTER type TPF Macros), until the end program. Additionally, the developers can execute the transaction in the TPF test environment and start tracing (e.g., using IBM or third party trace tools), and then collect the program details to generate the segment flow.

Challenges. Some of the prominent challenges in the use of TPF include extremely large number of programs executed even for small business functions, necessitating more time in analyzing the program flow. As assembler is a low level language, it is very difficult to understand the program logic and it takes more time for the developers to analyze and de-bug. Unlike high level languages, assembler instructions can interact directly with hardware components (e.g., registers, switches, and memory) as its operands (i.e., assembler instructions may require more than one operand to form an instruction). Assembler instructions are used as a source of data required for the operation or as the destination to store the result of the operation, or both. The developers need to understand the complete impact, specifications, and characteristics of these hardware components, before writing the code (e.g., all registers have maximum length of 64 bits). Any misuse of these critical hardware components (like corrupting system memory) might result in critical system failures such as even stopping the operating system, and end up in major application outages. As hardware components are common and shared resources, some of them are used by the operating system/other applications as well. The developers should not use them directly or should not change the data (e.g., TPF operating system uses Register R8 to store the base address of the source program while executing and the software developer should not use this register for application purposes).

Additionally, assembler instructions support various formats for writing its operands. For example, a data field containing some value can be written using either a label name (e.g., COUNT) or using Registers (e.g., 8(R4), where R4 is the Register containing the base address and 8 is the displacement of the field from the starting of the base address). Assembler has a large number of complex instructions and it is very difficult for the developers to remember all assembler instruction and formats (e.g., zTPF supports 500+ assembler instructions). Another issue is poor TPF source program documentation and/or the TPF documentation may not be updated for a long period of time.

Additionally, there is a shortage of skilled developers. Many senior developers are retired and a new generation of developers is generally not interested in working with low level languages, because of the ease of working with the new generation of programming languages (e.g., Java).

Additionally, there may be present extremely complex business logic and/or a large number of programs. Most programs are handling the core business which has a huge business impact (e.g., programs that are the interface to multiple applications and systems). There are also a shortage of tools available for analyzing, testing, and de-bugging assembler programs. Due to the complexity, the longer product turn-around time impacts the faster go to market strategy. There is also a lack of availability of proper test systems and/or test environment. Test systems are also expensive and their availability is limited and/or restricted in many TPF installations.

Additionally, numerous transactions exist for any business function and all of these transactions need to be analyzed individually one by one, resulting in huge analyzing effort as well as documentation. Often, it is not practical or possible to get the information on all of the transactions for a business function and the programs which were missed to analyze or modify, and may create serious errors while loading the modified code.

Additionally, in most TPF installations, developers cannot fully depend upon the existing application documentation for analysis, because of poor document quality standards and lack of regular updates. Analyzing TPF manually can take days of developer effort, as even for a small/less complex transaction that has hundreds of assembler programs in the segment flow. Also, analyzing TPF manually may not provide a meaningful picture because of the transaction complexity.

Additionally, for tracing, developers need to have a TPF test system and the application environment set up for executing the transaction to be traced. For example, for tracing a flight seat availability entry, flights should be available in the system with all required criteria (e.g., direct, connecting, etc.). Otherwise, it will not be possible to execute the transaction effectively and completely (i.e., may end in application error or incorrect results). Test systems and environment (e.g., connectivity to other systems/devices/interfaces, etc.) required for tracing are an expensive resource in most TPF installations and the availability of these resources is generally limited or restricted.

Additionally, it is difficult to understand the functional dependency of a TPF installation. Some of the programs which are present in the transaction flow of the traced entry may even be used by other business functions. It is difficult to get this information unless a detailed analysis of this program is carried out manually. For example, availability display transaction will execute programs which is used for retrieving the seat details from the flight inventory record. The same programs are used by flight inventory management application for retrieving the same.

Additionally, tracing of a transaction will indicate the flow of one out of many probable combinations of IF and ELSE conditions present in the program. As during execution, only the one condition out of multiple is satisfied and that is executed. Manually taking the other paths of the program requires a huge effort and is generally impracticable.

Problem Definition. In the TPF environment, business functions are developed using transactions. Each transaction is uniquely identified using a transaction code (e.g., a string of characters). User specific input data, which is required to process the business function, is provided as parameters to the transaction (appended after transaction code, as TPF generally does not support UI screens).

For example, in a TPF based airline system, a user will enter the following transaction to display the flight seat availability: ">A10MARLONNYC" where "A" is the transaction code for flight seat availability, "10MAR" is the date for which the availability display is requested, "LON" and "NYC" is the origin and destination city codes for London and New York, respectively. For each business function, there will be large number of transactions based on the various parameters provided by the user to achieve the required result.

Figure 3:
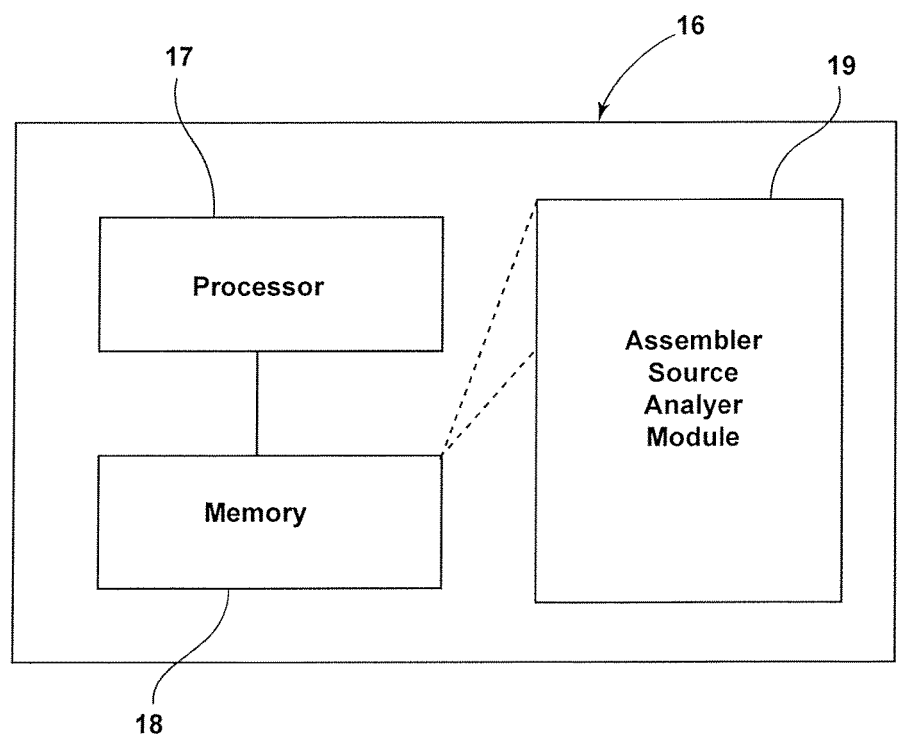
FIG. 3 is a block diagram generally illustrating an embodiment of an assembler source analyzer tool including an assembler source analyzer module in accordance with teachings of the present disclosure.

In the illustrated embodiment, FIG. 1 is a simplified diagram showing, in greater detail, a simple program segment flow 1 of a business transaction for analysis by assembler source analyzer tool 16 (as shown in FIG. 3).

For each transaction code, there will be a unique application program which is activated by the TPF operating system when the user enters the transaction (containing the transaction code) in the computer terminal. This first application program is generally known as driver program 2 for that function (referred to also as "P1" in FIG. 1) and is provided via user entry 4. Driver program 2 will call (or transfer control to) one or more other application programs designated by reference numeral 6 based on the user parameters that are to be processed (also referred to as "P2" through "Pn" in FIG. 1). In many cases, there will be hundreds of application programs ("program" is also called "segment" in TPF terminology) 6 that must be executed for a business transaction to complete, resulting in an output 8. A list of application programs 6 that are executed for a transaction constitutes the program or segment flow.

There are two major reasons why such a large number of programs are required for a particular transaction—program size and modularity. The program size supported by the earlier versions of TPF (i.e., prior to zTPF), was only 4 K bytes resulting in the need to write another program to complete the logic required beyond the 4 K size. For maintaining the modularity and to improve the code re-usability, each business function is divided into smaller functions (subfunctions/subroutines). For example, during the availability display processing mentioned above, for validating the date, there will be a subfunction activated and the same subfunction will be used by all other transactions which have the input date in this format and require validation.

As a result of the program size and modularity, TPF transfers the control between programs using the following TPF macros between assembler programs. These macros are called control transfer macros (also termed as "ENTER" or "ENT" type of macros): "ENTRC" (enter with return); "ENTNC" (enter without return); and "ENTDC" (enter without return—drop all previous program call information). For example, the following statement in an assembler program will transfer the control to the "ABCD" program from the current program: "ENTRC ABCD". The TPF macro "BACKC" will return the control to the program which previously made a call with return. Also, the macro "EXITC" completes the transaction.

Figure 2:
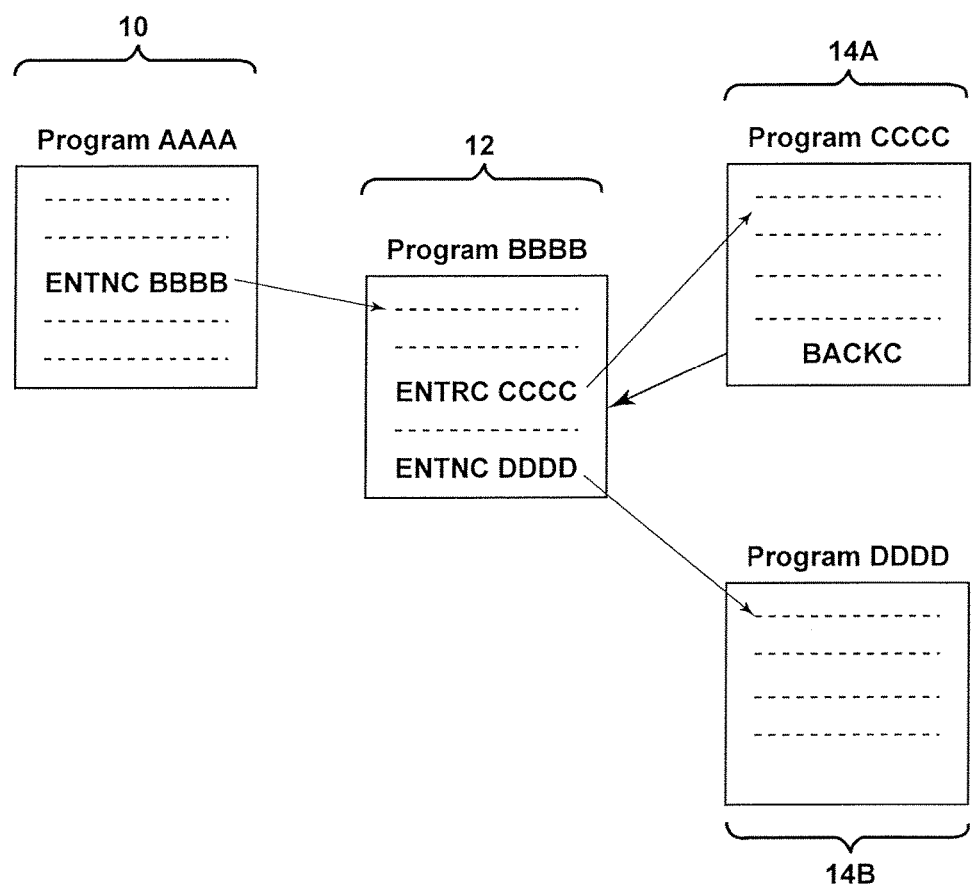
FIG. 2 is a block diagram generally illustrating an example of a control transfer between three assembler source code programs in accordance with teachings of the present disclosure.

FIG. 2 illustrates another example of a simple control transfer between three assembler programs. Program 10 "AAAA" contains an assembler macro "ENTNC BBBB" that transfers control of program 10 to program 12 "BBBB" and program 10 stops with no return expected. Program 12 "BBBB" via macro "ENTRC CCCC" transfers control to program 14A "CCCC" and then returns control to program 12 "BACKC". Program 12 "BBBB" via macro "ENTNC DDDD" transfers control to program 14B "DDDD" with no return expected.

Problem Situation. Whenever any business function is modified in a TPF application, as a first step in the analysis, developers are required to identify all transactions existing for this function and the programs executed during each transaction. In short, they must identify all affected programs (program/segment flow) for detailed analysis. Most of the business critical functions in TPF applications have a large number of transactions. For example, there are different transactions for flight seat availability (e.g., direct availability between two cities, connecting availability through a specific connection city, return availability, availability for a specific class of travel, etc.). For each transaction, the program or segment flow varies based on the actual work done by the transaction and depending on the values of the user input parameters (e.g., date, origin & destination, etc., for an availability display).

Embodiments consistent with the instant teachings provide solutions to one or more of the above-identified challenges. Embodiments provide an assembler source analyzer tool to analyze assembler source code. Embodiments of the assembler source analyzer tool include features such as automated accelerators for analysis, parsing, language conversions, segment flow analysis, and business rule extraction.

Before proceeding to a detailed description of various embodiments of an segment flow trace analyzer tool, a general overview of an assembler source code analyzer system will first be set forth in order to provide context in which the segment flow trace analyzer tool resides.

FIG. 3 is a simplified block diagram of a computer implemented system 16, in an embodiment, for assembler source code analysis. In the illustrated embodiment, system 16 (sometimes referred to as the assembler source analyzer tool) may include one or more processors 17, memory 18, a variety of input/output mechanisms (not shown), such as a display, a microphone, a speaker, and a network interface (wired or wireless). The system 16 includes, for example stored in memory 18, an assembler source analyzer module (or modules) 19 contains processor instructions defining code which when executed by processor 17 are configured generally to facilitate the analysis of assembler source code/programs/applications as described below.

Processor 17 is configured generally to control the overall operation of system 16, including coordination and cooperation among and between the other components of system 16. In an embodiment, processor 17 is configured to execute a suitable operating system. Processor 17 may include a central processing unit (CPU), memory (in addition to, or such as, the illustrated memory 18), and an input/output (I/O) interface through which processor 17 may receive a plurality of input signals and to generate a plurality of output signals.

Memory 18 is provided for storage of data and instructions or code (i.e., the above-mentioned code or software), for processor 17. Memory 18 may include various forms of non-volatile (i.e., non-transitory), memory including flash memory or read only memory (ROM), including various forms of programmable read only memory (e.g., PROM, EPROM, EEPROM), and/or volatile memory including random access memory (RAM), including static random access memory (SRAM), dynamic random access memory (DRAM), and synchronous dynamic random access memory (SDRAM). Although illustrated as a separate component in the illustrated embodiment, it should be understood that memory 18 may be internal to processor 17.

Figure 4:
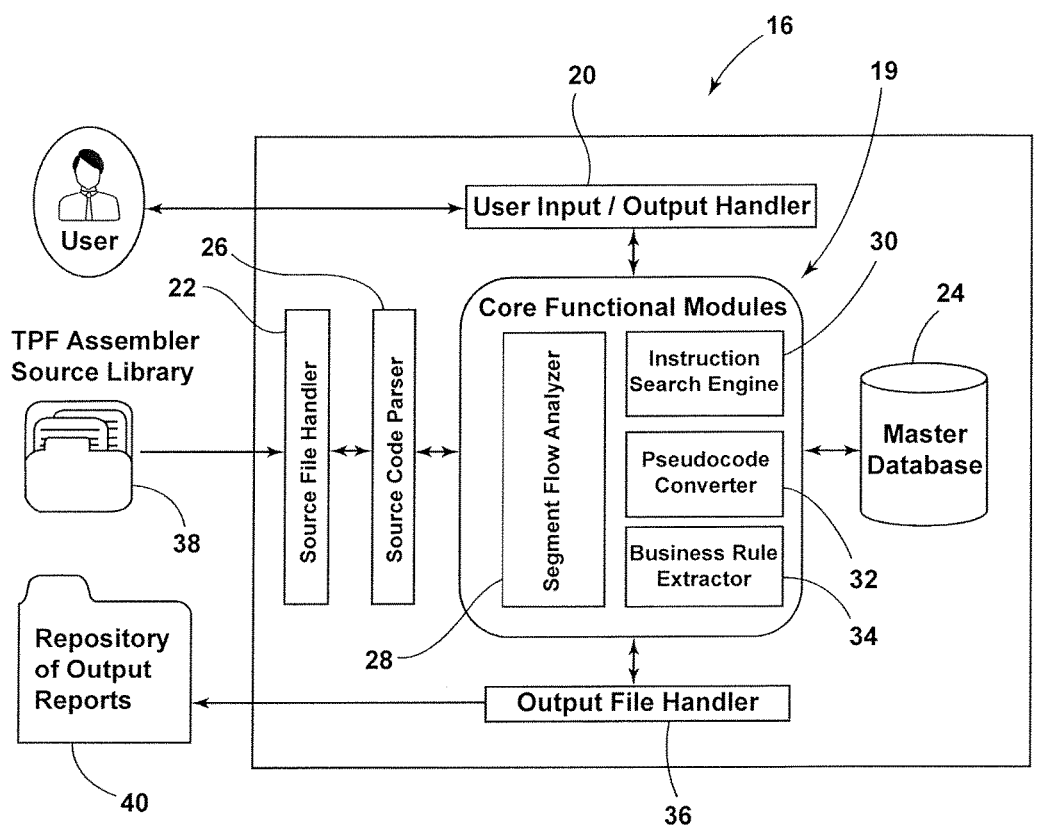
FIG. 4 is a block diagram generally illustrating an embodiment of an assembler source analyzer tool with input, output, and core functional modules in accordance with teachings of the present disclosure.

FIG. 4 is a simplified block diagram showing, in greater detail, the various functional modules(s) that may be included in assembler source analyzer module(s) 19 in an embodiment. In this regard, assembler source analyzer module(s) 19 may include one or more modules that may include one or more tools, such as, but not limited to, a user input/output handler module 20, a source file handler module 22, a master database 24, a source code parser module 26, a segment flow analyzer module 28, an instruction search engine 30, a pseudocode converter module 32, and a business rule extractor module 34. It should be understood that each of the referred-to modules and/or tools may comprise processor instructions/code or software stored in memory 18 and configured for execution by one or more processors 17. Generally, assembler source analyzer module(s) 19 determines information from and about the assembler source code and presents it to the developer in a meaningful way.

Assembler source analyzer module(s) 19 is incorporated into assembler source analyzer tool 16 designed to address the challenges described herein that are faced by TPF software developers. An objective of the assembler source analyzer tool 16 is to generate information from TPF assembler source programs instantaneously and/or interactively which can assist TPF software developers in analyzing, de-bugging, and testing much faster and with improved quality. Assembler source analyzer tool 16 operates on the philosophy that source code has the complete and actual information and only the interpretation of the code is required.

Assembler source analyzer tool 16 analyses all the assembler source programs as selected by the user from any assembler source library and instantaneously generates information on whether these assembler programs are connected (e.g., called each other using the ENTER type of TPF macros), and how they are connected, if a connection exists. Assembler source analyzer tool 16 also provides complete flow of programs starting from any user selected program (e.g., driver program), or flow details ending to any selected program.

Assembler source analyzer tool 16 may include the following components and/or modules. Generally, assembler source analyzer tool 16 includes a user input/output handler (UIO) module 20 that handles the input and output screens required for user interactions. UIO 20 generates the screens for all user interfaces and validates the user data. UIO 20 provides the drop down lists using the values from the master database 24, wherever applicable. UIO 20 extracts the input data and passes the input data to the instruction search engine (ISE) 30 which handles the user requested function. Appropriate error messages are displayed in case of any invalid data. Finally, UIO 20 displays the status of the execution to the user.

Additionally, assembler source analyzer tool 16 includes a source file handler (SFH) module 22. SFH 22 manages the selection of assembler source files (i.e., programs) from the user selected folder in the TPF system. SFH 22 selects only files containing assembler source programs from the folder (e.g., using the file name extension like .asm and .txt). A user can also filter the files based on the package, function, or program (e.g., using the characters in the file name).

Additionally, assembler source analyzer tool 16 includes a master database 24. Master database 24 has detailed information about all assembler instructions, formats, and TPF Macros, which is required for parsing and interpreting the assembler instructions and TPF Macros.

Additionally, assembler source analyzer tool 16 includes a source code parser (SCP) module 26. Reading and parsing of the source code in the programs selected by the user is managed by SCP 26. SCP 26 reads all lines in the source program and parses it into assembler instructions, assembler directives, TPF Macros, TPFDF Macros, commented code, and comments. All valid instructions are further parsed to identify operands. For assembler directives, TPF Macros, and TPFDF Macros, SCP 26 will identify the parameters used.

Additionally, assembler source analyzer tool 16 includes a segment flow analyzer (SFA) module 28. SFA 28 takes care of segment flow analyzer functions. SFA 28 takes the input from UIO module 20 and/or SFH module 22. Based on this, SFA 28 processes all programs selected by the user and generates the results.

Additionally, assembler source analyzer tool 16 includes an instruction search engine (ISE) 30. ISE 30 takes care of all search functions like generic search, instruction search, etc. ISE 30 tries to search the user specified parameter in the source code, line by line, and generates the list of lines with match.

Additionally, assembler source analyzer tool 16 includes a pseudocode converter (SC) module 32. Generating the high level pseudocode for every assembler instruction is handled by this SC 32. SC 32 uses the output of the parser module to identify the appropriate template in the master database and fills-in the components and generates the pseudocode for every line in the source code.

Additionally, assembler source analyzer tool 16 includes a business rule extractor (BRE) module 34. Extracting the business rule from the source program is managed by BRE 34. BRE 34 takes input from the UIO module 20 and process all files selected by the user to extract the source code matching the rule(s) specified by the user.

Additionally, assembler source analyzer tool 16 includes an output file handler (OFH) module 36. OFH 36 saves the output files in a user specified folder for future reference and analysis. The user can specify any folder which the user has the appropriate access to and saves all output files to that folder.

Additionally, assembler source analyzer tool 16 includes means to access for input purposes a TPF assembler source library 38.

Additionally, assembler source analyzer tool 16 includes means to access for output purposes a repository of output reports 40.

General Features. Assembler source analyzer tool 16 is, in an embodiment, developed using JAVA technology and can be installed in any open system environment. Assembler source analyzer tool 16 does not need TPF system connectivity, only the TPF application assembler source library needs to be accessible (for example, in Linux). Frequently used installation specific parameters, such as location and name of the assembler source library, can be defined in a simple configuration file so that user need not specify these details every time tool starts (i.e., automatically they are loaded from the configuration file). Assembler source analyzer tool 16 can select assembler source programs from any source library and can save the analysis results in any folder. A facility is also provided to manually select/de-select any individual segments in the displayed list for the analysis. The results of the analysis are displayed in detailed text format as well as in graphical form as described below. Assembler source analyzer tool 16 accepts standard formats for input source files (e.g., text, MS Word and ASM (assembler)). Assembler source analyzer tool 16 is simple and easy to use, with screen based navigations and interactions for the user.

Functional Features. Segment flow analyzer module 28 generates information on whether the user selected programs are connected to each other or not (e.g., connected by virtue of using an ENTER type TPF Macro as described above). Segment flow analyzer module 28 generates a detailed report on calls made by each selected program to other programs, calls made by other programs to each one of the selected programs, and programs that never made any call nor have been called by any other program.

Additionally, segment flow analyzer tool 28 generates a list of programs (as shown in FIG. 14) found in the flow and which start from a user-specified program (e.g., driver program)—this is called a forward trace. Segment flow analyzer module 28 generates a list of programs found in the flow ending to a specific user-selected program—this is called a reverse trace. Segment flow analyzer module 28 generates a list of programs that are called but not found in the source library (or not selected). Segment flow analyzer module 28 generates a graphical representation of the segment flow with details of the nature of the call (specific macro) for all selected programs found connected each other.

Additionally, segment flow analyzer module 28 includes the following additional functions to support the detailed further analysis of individual programs in the flow, if required. A generic search function that searches assembler source code for the user specified input string and displays those lines with match. An assembler instruction search function that displays lines in assembler source file that has the matching instruction code specified in the search input (commented code and comments are not considered for search). An assembler pseudocode search function that searches based on the high level operation performed by assembler instructions. This is similar to instruction search with an additional facility to specify a pseudocode (e.g., "COMPARE"). An assembler directive search function that is used to search assembler directives (e.g., "DS", "DC", "EQU", etc.), in the source program. A TPF macro search function that is used to search TPF macros in the assembler source code and helps software developers in extracting TPF macros based on the various options supported by the tool. A TPFDF Macro Search function that is used to search TPFDF macros used in the assembler source program can be searched using this function. A pseudocode conversion function that converts assembler instructions in the source code to a high level pseudocode, which is easily understandable and helps in faster code analysis. A data trace function that allows a user to discover data movement from a field/value to other fields in the assembler source programs.

A rule extraction function that allows a user to extract the immediate portion of code which is executed when a specific condition is matched (e.g., "FIELDA is equal to FIELDB").

Figure 5:
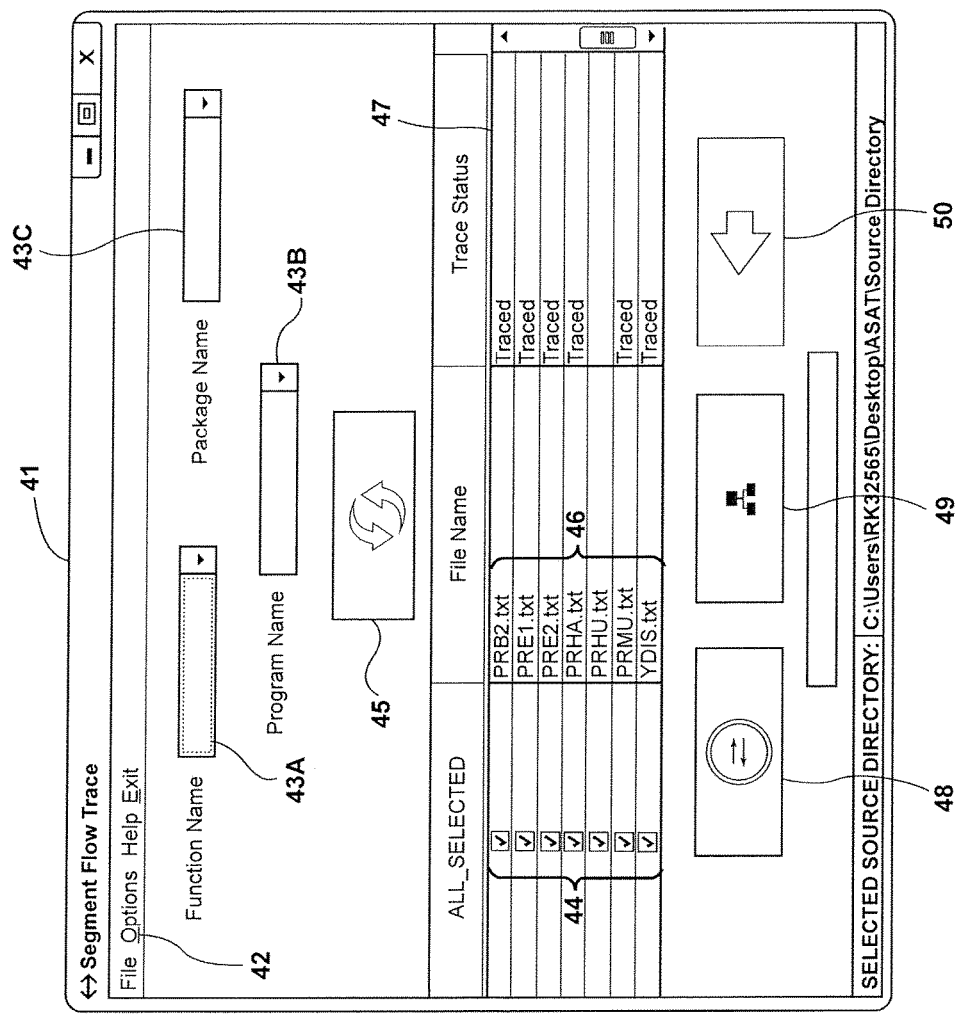
FIG. 5 is a screenshot generally illustrating an embodiment of a graphical user interface of a segment flow trace analyzer tool, in accordance with teachings of the present disclosure.

FIG. 5 illustrates a graphical user interface (GUI) 41 provided by segment flow analyzer module 28, in an embodiment. As shown in FIG. 5, a user can utilize segment flow analyzer module 28 to select the required TPF assembler source library 38 (as shown in FIG. 4) containing the assembler programs (or assembler segments) to be analyzed using GUI 41. The GUI 41 includes a standard window directory selection bar 42 containing, for example, "File" and/or "Options". By default, all assembler programs 46 present in the user selected source library will be displayed as automatically selected, as indicated by check boxes 44. In embodiments, a user can display and select assembler programs (or segments) based on the various filtering options (e.g., function, package, and program names), using the drop down lists 43A, 43C, and 43B, respectively, from the complete list of assembler programs available in the source library. Additionally, a facility (check boxes 44) is also provided for a user to manually select/de-select any individual assembler programs (or segments) from the displayed list of assembler programs 46. A source assembler program can be opened for view in read-only mode by the user double clicking on any assembler program name. The list of assembler programs may be refreshed by the user by clicking on the refresh button 45. It should be appreciated that the "Function Name" filter and the "Package Name" filter allows the user to select a respective function or package, which is predefined to be associated with a respective grouping of assembler programs (or segments).

A main objective of the segment flow analyzer module 28 is to identify the assembler programs 46 that are called while executing a transaction which is being analyzed by the software developer, for example, during modification of the code. Segment flow analyzer module 28 analyses all the assembler source programs 46 selected by the user from any assembler source library and instantaneously generates information on whether these assembler programs 46 are connected (e.g., called each other using the "ENTER" type of TPF macros), and how they are connected, where such connection exists.

Additionally, segment flow analyzer module 28 has the following functional features. Segment flow analyzer 28 generates information on whether the user selected assembler programs 46 are connected each other or not (e.g., using "ENTER" type TPF macro). Segment flow analyzer module 28 creates detailed report on: calls made by each selected program 46 to other programs 46; calls made by other programs to the each of selected programs 46; and programs 46 that never made any call or never been called by other programs 46.

Additionally, segment flow analyzer module 28 may include the following three (3) options for execution and the user can select any one (e.g., based on the user requirement), using the "Options" selection located in selection bar 42. The first is a comprehensive trace. A comprehensive trace analyzes all programs 46 and generates the resulting flow and report (this is the default option). The second is a forward trace. The forward trace generates the program flow starting from a user specified start program 46 (i.e., driver program 2, as shown in FIG. 1). The third is a reverse trace. The reverse trace generates the program flow ending with a specific user selected program 46.

Additionally, segment flow analyzer module 28 determines or otherwise identified which programs 46 are called but are not found (or not selected) in the TPF assembler source library 38 (as shown in FIG. 4). Segment flow analyzer module 28 generates a graphical representation of the segment flow with details of the nature of the call (specific macro) for all the selected programs 46 found connected to each other. Segment flow analyzer module 28 enables a user that is not interested in tracing certain programs 46, such as with respect to application or system utilities, to specify in the configuration file for the segment flow analyzer module 28 to ignore them.

Additionally, segment flow analyzer module 28 enables a user to define programs 46 to be excluded from the trace in the configuration file before starting the assembler source analyzer tool 16. Using segment flow analyzer module 28, it is also possible to define in the configuration file the particular access details for the assembler source library and the output folder for saving the results of segment flow analyzer module 28 in the configuration file so that user need not specify these details the same every time. An "Execute" button 48 enables a user to activate the segment flow analyzer module 28, a graph generator button 49 enables a user to direct the segment flow analyzer module 28 to generate a graph (e.g., comprehensive, forward, or reverse trace). The "Arrow" button 50 enables a user to return to the previous screen.

Additionally, as referred to above, the segment flow analyzer module 28 is configured to use configuration details contained in a configuration file. The configuration file is used to configure the environment for the segment flow analyzer module 28 to operate, so that user does not need to specify the parameters every time the segment flow analyzer module 28 is used. The configuration file may be configured to contain the following information: assembler source library location and name; folder details (location) for saving the tool output results; and programs to be excluded for further tracing (e.g., applications, system utilities).

Figure 6:
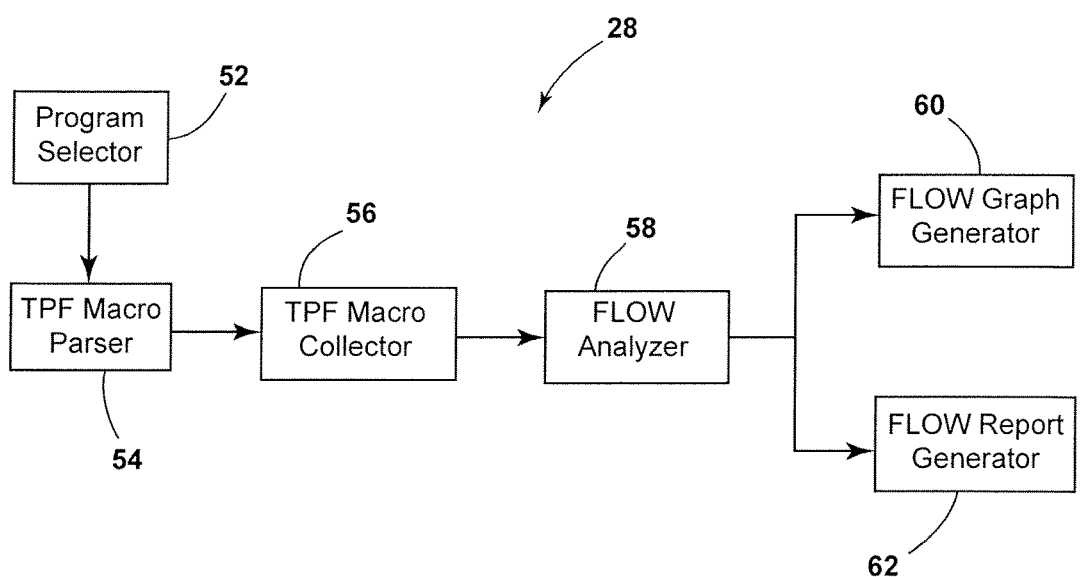
FIG. 6 is a block diagram generally illustrating an embodiment of segment flow analyzer components in accordance with teachings of the present disclosure.

In the illustrated embodiment, FIG. 6 is a simplified block diagram showing, in greater detail, the various functional modules(s) included in segment flow analyzer module 28. This block diagram shows the internal flow/function of segment flow analyzer module 28. In this regard, segment flow analyzer module 28 may include one or more modules that may include one or more tools, such as, but not limited to, a program selector 52, a TPF macro parser 54, a TPF macro collector 56, a flow analyzer 58, a flow graph generator 60, and a flow report generator 62. It should be understood that each of the referred-to modules and/or tools may comprise software stored in memory 18 and include processor instructions or code configured for execution by one or more processors 17.

Segment flow analyzer module 28 may include the following components and/or modules. Generally, segment flow analyzer module 28 includes a program selector (PS) 52. Program selector 52 is part of the source file handler (SFH) 22 and provides the facility to select the assembler programs as required by the user. Program selector 52 provides the following selection features: based on the business functional area (represented by the first character of the program name); based on the package name within the functional area (represented by the first two characters of the program name); based on the program name within the functional area (represented by the first three characters of the program name); and manual selection/de-selection of individual programs from the displayed list of the user.

Additionally, segment flow analyzer module 28 includes a TPF macro parser (TPF) 54. TPF macro parser 54 identifies the TPF macros in the assembler source program with help of a master database 24 which contains all TPF macros.

Additionally, segment flow analyzer module 28 includes a TPF macro collector (TMC) 56. TMC 56 collects (i.e., stores in memory), "ENTER" type TPF macros in the assembler source program, with is used for analyzing the program flow by the flow analyzer 58.

Additionally, segment flow analyzer module 28 includes a flow analyzer (FA) 58. Flow analyzer 58 analyses the "ENTER" type TPF macros found in the assembler source program and creates all mapping information required for creating the reports and graphs.

Additionally, segment flow analyzer module 28 includes a flow graph generator (FGG) 60. Flow graph generator 60 creates the segment flow in the graphical format based on the information from the flow analyzer 58.

Additionally, segment flow analyzer module 28 includes a flow report generator (FRG) 62. Flow report generator 62 creates the detailed segment flow report in text format based on the information from the flow analyzer 58.

Figure 7:
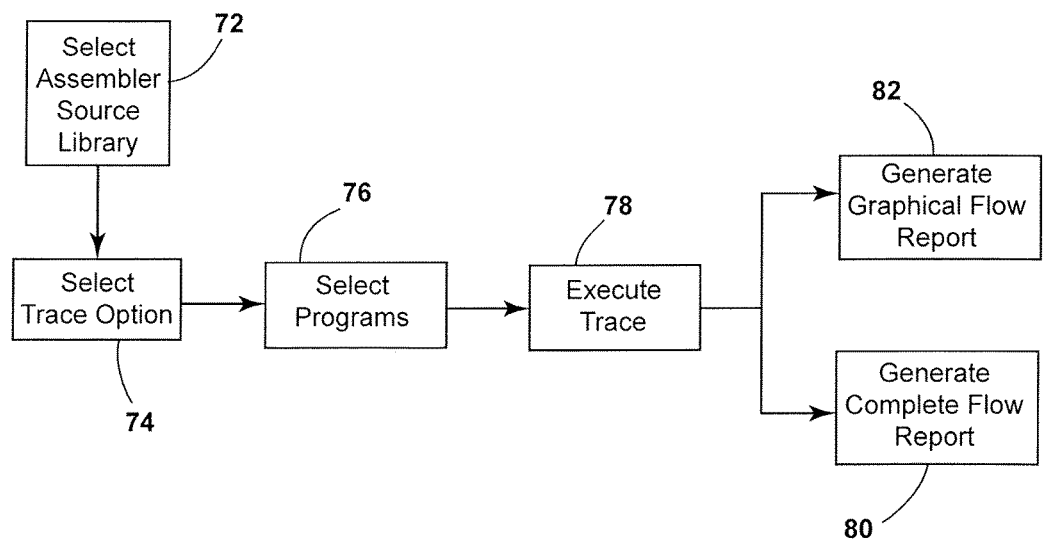
FIG. 7 is a block diagram generally illustrating an embodiment of a diagram of a segment flow trace process in accordance with teachings of the present disclosure.

FIG. 7 is a high level flowchart illustrating, in an embodiment, the operation of a method of operation of the segment flow analyzer module 28 included in the larger assembler source analyzer tool 16. This flowchart differs from that shown in FIG. 6 in that FIG. 7 reflects the operation from the user's point of view (i.e., the user's interaction with the interface). The method begins in step 72.

In step 72, the user starts the assembler source analyzer module(s) 19 and then selects segment flow analyzer module 28, such as, but not limited to, using a drop down menu in a graphical user interface (GUI) 41 (as shown in FIG. 5). By default, all programs 46 in the user selected source library will be displayed and automatically selected. The user has the option to select (or de-select) files based on the function, package, or program names. The user may also select/de-select any program manually be clicking on the check boxes 44 designated for the programs 46. The method then proceeds to step 74.

In step 74, the type of segment trace is selected by the user using the selection bar 42. By default, the comprehensive trace option is selected automatically. However, the user has the option to select either forward trace or reverse trace using the selection bar 42 in GUI 41. The method then proceeds to step 76.

In step 76, if the default comprehensive trace option is not desired by the user, the user selects the starting program (i.e., driver),by right clicking using an input device (e.g., a mouse), on the required program 46 shown in GUI 41 for the forward trace option. Alternatively, the user selects the end program 46 by right clicking on the desired program 46 for the reverse trace option in GUI 41. The method then proceeds to step 78.

In step 78, the user, after making the desired selections, clicks on the "Execute" button 48 in GUI 41 (as shown in FIG. 5) to execute the selected segment flow tracing option (e.g., comprehensive, forward, or reverse). After successful completion, a trace result message screen showing the number of user-selected programs 46 (as shown in FIG. 14) found in the flow will be displayed in GUI 41. Additionally, the trace status column 47 in GUI 41 will indicate the status as "traced" for all programs 46 that are connected with other programs 46 (i.e., programs in flow), (as shown in FIG. 14 as program trace status "Y"; default/initial program trace status "N") . The method then proceeds to step 80.

In step 80, the segment flow analyzer module 28 generates a text report. The user clicks on a "YES" button of the result message screen provided in GUI 41 to generate a detailed report (e.g., trace output summary file). The detailed report (not shown) contains the following information: 1) calls made by each selected program 46 to other programs; 2) calls made by other programs to the each of selected programs 46 (i.e., called by); 3) programs 46 that do not have any calls to other programs; 4) programs 46 that have never been called by other programs; 5) programs 46 that were called but could not be found in the selected list of programs; 6) programs 46 that are not traced because of indication in the configuration file skipping. The method then proceeds to step 82.

Figure 9:
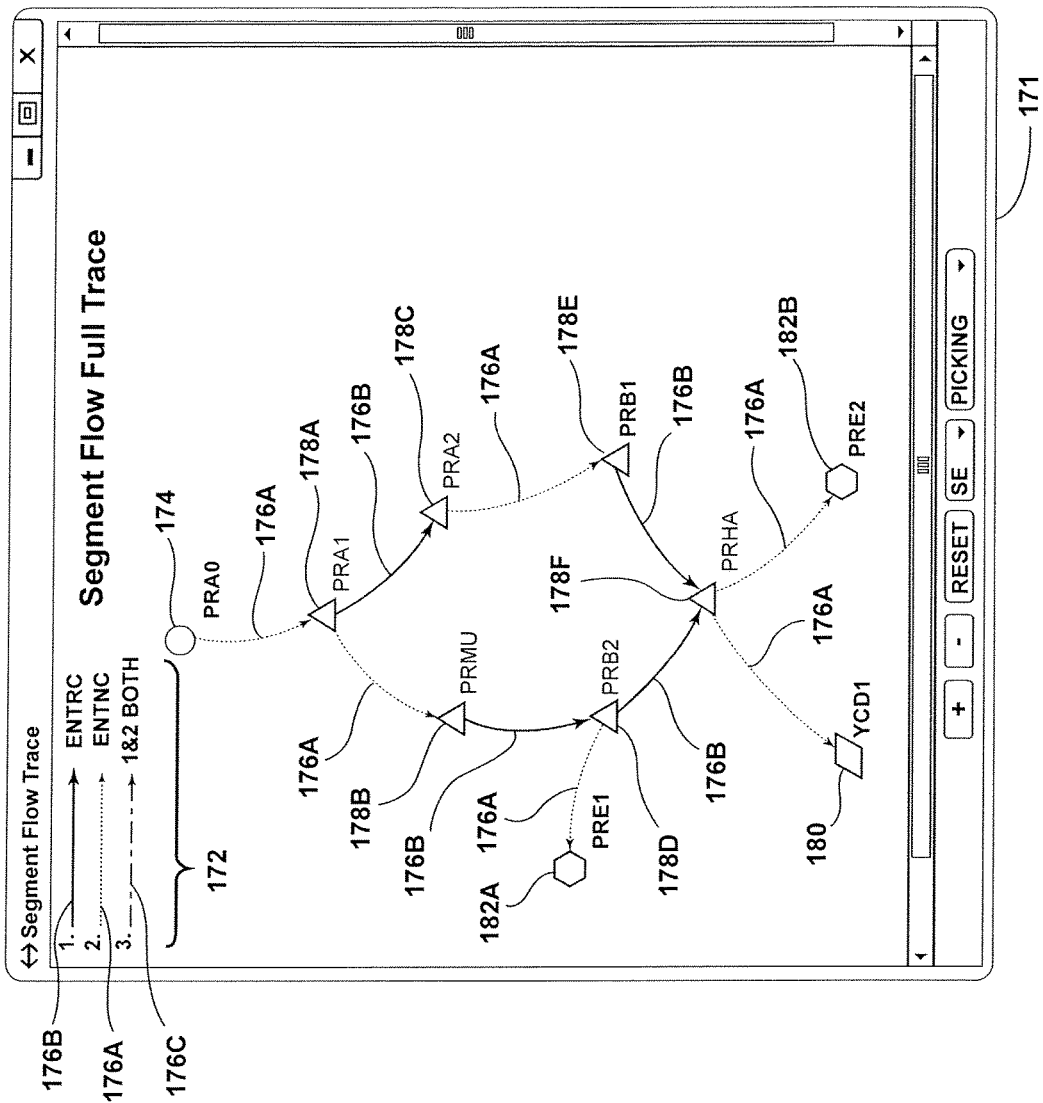
FIG. 9 is a graphical output generally illustrating a comprehensive flow trace diagram produced by the method and apparatus for segment flow analysis, in accordance with teachings of the present disclosure.
Figure 11:
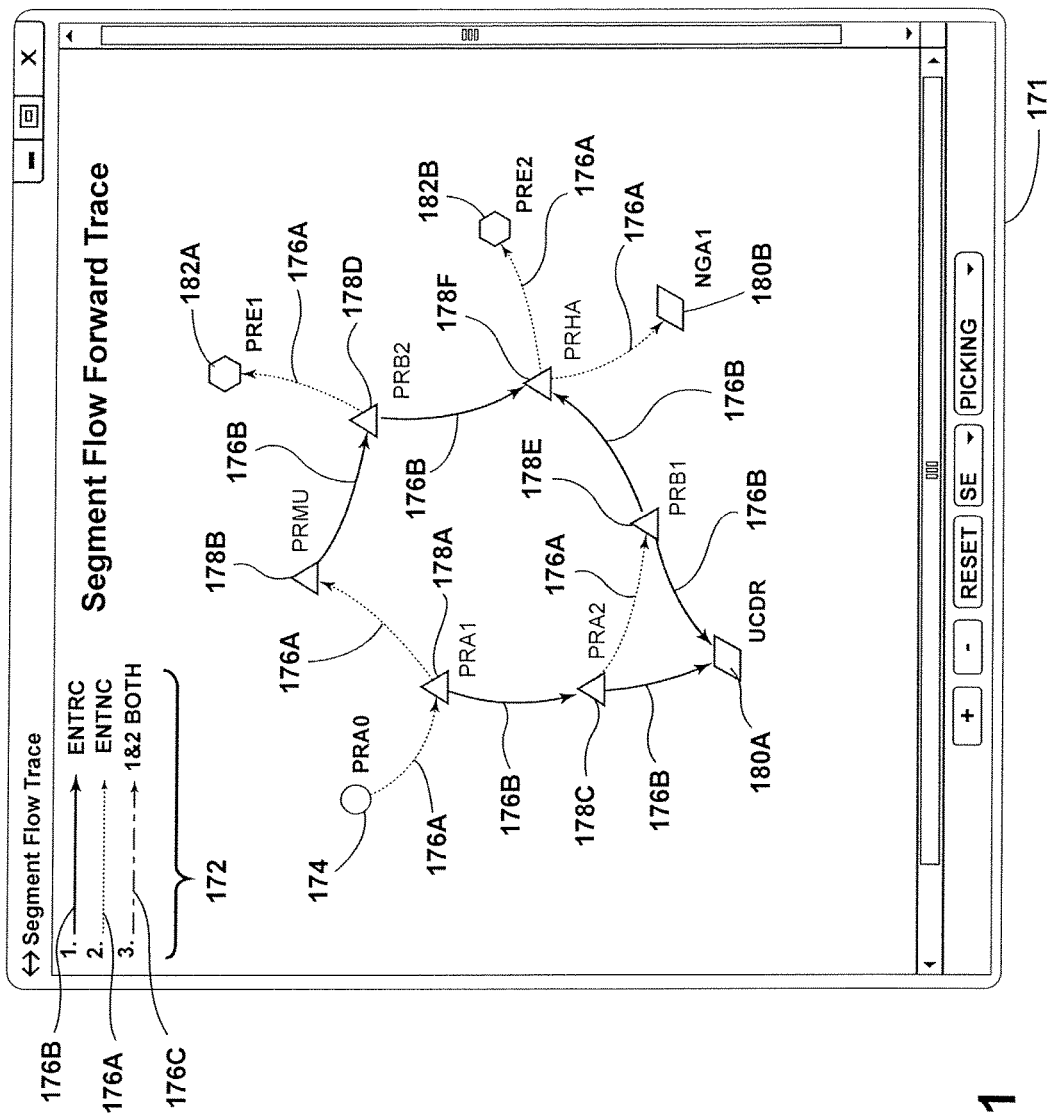
FIG. 11 is a graphical output generally illustrating a forward flow trace diagram produced by the method and apparatus for segment flow analysis, in accordance with teachings of the present disclosure.
Figure 13:
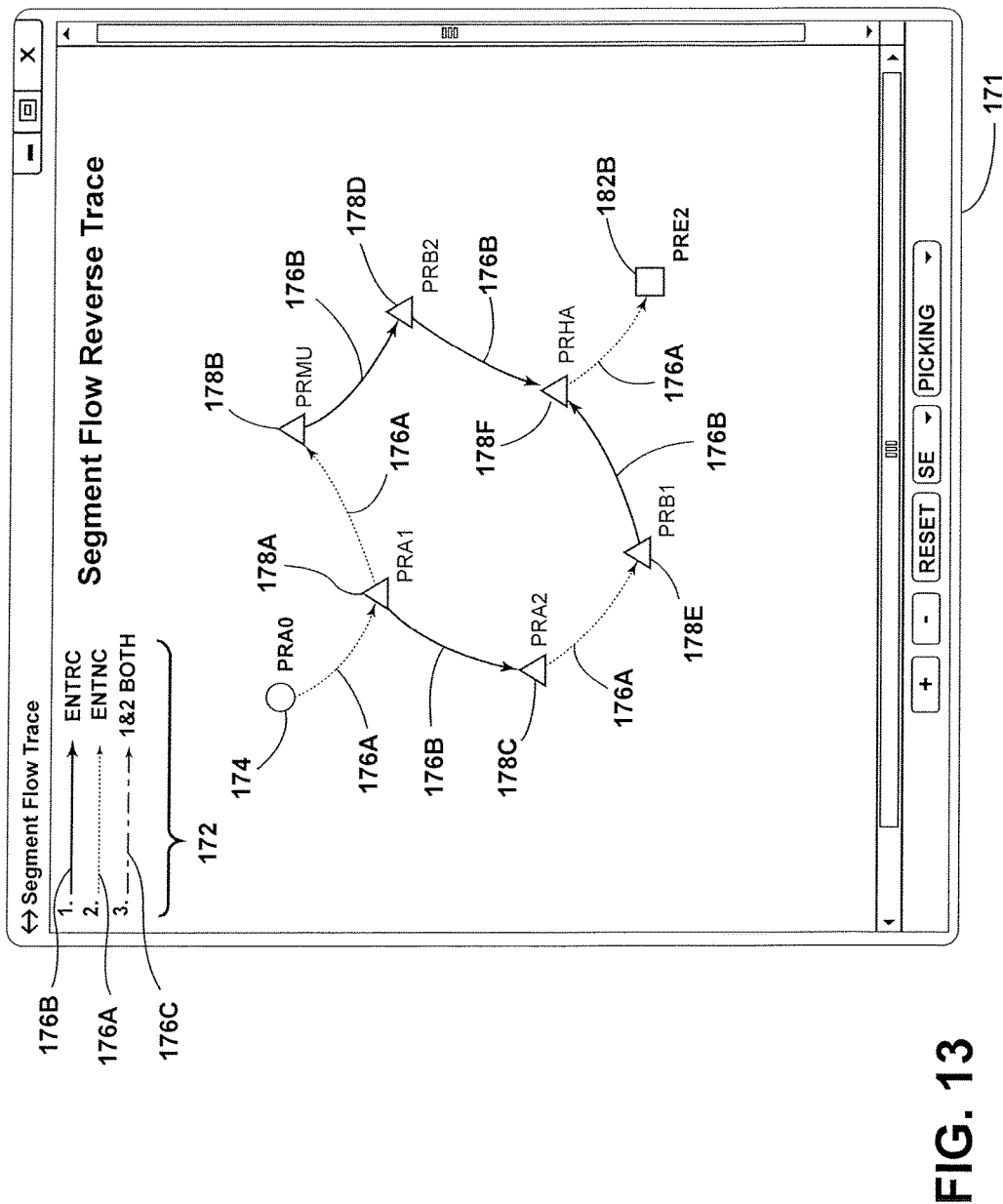
FIG. 13 is a graphical output generally illustrating a reverse flow trace diagram produced by the method and apparatus for segment flow analysis, in accordance with teachings of the present disclosure.

In step 82, the segment flow analyzer module 28 can generate a graphical report (as shown in FIGS. 9, 11, and 13). The user can click on a graph generator button 49 in GUI 41. The segment flow analyzer module 28 generates a graphical diagram showing the program flow with details of program name and the type of call (e.g., macro type). In the graphical report, programs 46 are indicated using circles (or other symbols) and calls by arrow connectors, for example.

Additionally, the segment flow analyzer module 28 includes a macro table (as shown in FIG. 15). The macro table is an internal table created during the segment program flow processing and contains all TPF "ENTER" type macros collected from the programs analyzed. The macro file has the following format for every item: calling program name; TPF "ENTER" macro name; and called program name. For example, control transfer "AAAA ENTRC BBBB" which means "AAAA" is the calling program and "BBBB" is the called program (i.e., program "BBBB" is called by "AAAA" using the "ENTRC" macro). Segment flow analyzer module 28 uses the macro table generate the final report and graphical flow diagram, as described in steps 80 and 82, above, respectively. The macro table is discussed in further detail below.

The segment flow analyzer module 28 includes a configuration file in memory that, when executed by the segment flow analyzer module 28, configures an operating environment for the segment flow analyzer module 28. The operating environment configured by the segment flow analyzer module 28 may include parameters that permit segment flow analyzer module 28 to operate without requiring a user to input information previously input. The configuration file may include an assembler source code library location and/or name, file details for saving (i.e., storing), segment flow analyzer module 28 output results, and programs to be executed for further segment flow tracing (such as applications and/or system utilities).

Macro Table Creation. The macro table (as shown in FIG. 15) is an internal (i.e., part of segment flow analyzer module 28) table created during program flow (i.e., comprehensive, forward, reverse), processing and contains TPF macros collected (i.e., captured), from the applications (i.e., programs), analyzed. The macro table of segment flow analyzer module 28 has the following format: calling program name, TPF ENTER macro name, and called program name.

For example, a macro table entry of segment flow analyzer module 28 may be "AAAA ENTRC BBBB". Where "AAAA" is the calling program and "BBBB" is the called program (i.e., program "BBBB" is called by program "AAAA" using the "ENTRC" macro). During the program flow processing, selected programs may be searched for TPF ENTER macros. If TPF ENTER macros are found, an item (i.e., table entry), may be added to the macro table with the details described above. The programs that may be mentioned in the configuration file (described above) under the category of programs to be excluded from tracing, may not be searched. The macro table is used by segment flow analyzer module 28 to generate the final reports and graphical flow diagram (described below and shown in FIGS. 9, 11, and 13).

Macro Table Creation Logic. The comprehensive (also used for reverse) flow trace of segment flow analyzer module 28 logic includes the following steps:

Get a list of all programs selected by the user from the program selection menu of segment flow analyzer module 28;

For each program in the list;
Check whether the program is excluded for trace as per configuration file;
If (the program) is excluded: skip the program and process the next program;
Else;
Open the program and search for the TPF ENTER macros (in the opened program);
If macro(s) found;
Update the details of the called (not excluded) program, and update macro table with macro (TPF ENTER) type;
End;
End.

The forward flow trace of segment flow analyzer module 28 logic includes the following steps:

Step 1: Process the "start" program.
Get the user selected "start" program from the program selection menu;
Open the "start" program and search for the TPF ENTER macros;
If macro(s) found:
Update the details of called program, macro type in the macro table;
Continue processing Step 2;
Else;
Stop processing (no program chains found for processing).
Step 2: Process the program chain.
Read macro table;
If no items (i.e., TPF ENTER macros), found: stop processing;
Check whether item is processed or not;
If processed: skip this item and go to Step 2 for processing next item;
Else;
Get the "called programs" (third field of macro table);
Check whether this program is already processed or not (to avoid repeated processing of loops);
If not processed:
Open the program and search for TPF ENTER macros;
If macro(s) found;
Update the details of the called program, macro type in macro table;
End;
Indicate that this program is processed;
End;
Indicate that this program is processed;
Go to Step 2 and continue.

Macro table processing logic for generating reports and graphs. The macro table may include information about TPF Macro calls with calling and called programs collected from the user-selected programs.

Generating reports.

Segment calling report. In order to generate a segment calling report, the macro table (as shown in FIG. 15) is sorted by the calling program (first field). Each calling program is processed and the details of each called program are captured (i.e., obtained). The segment call report is generated based on the "calling program."

Segment called report. In order to generate the segment called report, the macro table is sorted by the called program (third field). Each called program is processed and the details of each calling program is captured (i.e., obtained). The segment called report is generated based on the "called program."

Segments that are not called report. The third field of the macro table (called program) is searched for a specific segments that are not called. If the specific segments are not found, the program names (containing the segments) are moved to the segments that are not called report.

Segments that do not have calls report. The first field of the macro table (calling program) is searched for a specific segments that are not called. If the specific segments that do not have calls are not found, the program names (containing the segments) are moved to the segments that do not have calls report.

Generating segment flow reports and graphs. The segment flow reports and graphs are generated by the segment flow analyzer module 28 which sorts the macro table according to the calling program (first field), as shown in FIG. 15. The segment flow analyzer module 28 receives a user-selected start (or end) program. Using the graphical report as illustrated in FIG. 9 as an example, the user selected start program is "PRA0". The segment flow analyzer module 28 assigns a symbol 174 to program "PRA0" and displays symbol 174 in flowchart GUI 171 along with program name "PRA0". Segment flow analyzer module 28 searches the macro table calling program field for program 174 "PRA0". If program 174 "PRA0" is not found, the segment flow ends and only the program 174 "PRA0" is displayed. However, if one or more called programs are found in the macro table called by program 174 "PRA0", segment flow analyzer module 28 moves that program(s) to a temporary list for further segment flow analysis (i.e., tracing). In the present example illustrated in FIG. 9, program "PRA1" is called by user-selected start program 174 "PRA0". It should be understood that additional programs may be called by program 174 "PRA0". The segment flow analyzer module 28 assigns symbol 178A to "PRA1" and displays symbol 178A in flowchart GUI 171 along with program name "PRA1". Segment flow analyzer module 28 also displays, in flowchart GUI 171, an arrow indicating the flow of program 174 "PRA0" to program "PRA1". The type of arrow displayed is dependent on the TPF macro. In the present example illustrated in FIG. 9, the TPF macro is "ENTNC", which is denoted by dotted arrow 176A, starting at program 174 "PRA0" and pointing to program "PRA1". While not used in this particular example, a TPF flow including both "ENTNC" and "ENTRC" is denoted by dashed arrow 176C. It should be understood that other symbols apart from an arrow may be used by segment flow analyzer module 28 to denote the flow of a TPF macro. Additionally, the arrow may be two headed arrow (i.e., an arrow with pointed ends on either side).

Continuing with the graphical report as illustrated in FIG. 9 as an example, segment flow analyzer module 28 searches the macro table calling program field for program "PRA1". If one or more called programs are found in the macro table as called by program "PRA1", segment flow analyzer module 28 moves that program(s) to a temporary list for further flow tracing. Segment flow analyzer module 28 searches the macro table called program field for program(s) that are called by program "PRA1". In the present example, program "PRMU" and program "PRA2" are called by program "PRA1". Segment flow analyzer module 28 assigns symbol 178B to program "PRMU" and symbol 178C to program "PRA2" and displays symbols 178B and 178C in flowchart GUI 171 along with program names "PRMU" and "PRA2", respectively. Segment flow analyzer module 28 also displays in flowchart GUI 171 two arrows indicating the flow of programs "PRMU" and "PRA2" to program "PRA1". The type of arrows displayed are dependent on the TPF macro. In the present example illustrated in FIG. 9, the TPF macros are "ENTNC", which is denoted by a dotted arrow 176A, starting at program "PRA1" and pointing to program "PRMU" and "ENTRC", which is denoted by solid arrow 176B, starting at program "PRA1" and pointing to program "PRA2".

Segment flow analyzer module 28 then searches the macro table calling program field for program "PRMU". If one or more called programs are found in the macro table as called by program "PRMU", segment flow analyzer module 28 moves that program(s) to a temporary list for further flow tracing. Segment flow analyzer module 28 searches the macro table called program field for program(s) that are called by program "PRMU". In the present example (as illustrated in FIG. 9), program "PRB2" is called by program "PRMU". Segment flow analyzer module 28 assigns symbol 178D to program "PRMU" and displays symbol 178D and program name "PRB2" in flowchart GUI 171. Segment flow analyzer module 28 also displays in flowchart GUI 171 an arrow indicating the flow of program "PRMU" to program "PRB2". The type of arrow displayed is dependent on the TPF macro. In the present example illustrated in FIG. 9, the TPF macro is "ENTRC", which is denoted by solid arrow 176B, starting at program "PRMU" and pointing to program "PRB2".

Segment flow analyzer module 28 then searches the macro table calling field program for program "PRA2". If one or more called programs are found in the macro table as called by program "PRA2", segment flow analyzer module 28 moves that program(s) to a temporary list for further flow tracing. Segment flow analyzer module 28 searches the macro table called program field for program(s) that are called by program "PRA2". In the present example (as illustrated in FIG. 9), program "PRB1" is called by program "PRA2". Segment flow analyzer module 28 assigns symbol 178E to program "PRB1" and displays symbol 178E along with program name "PRB1" in flowchart GUI 171. Segment flow analyzer module 28 also displays in flowchart GUI 171 an arrow indicating the flow of program "PRA2" to program "PRB1". The type of arrow displayed is dependent on the TPF macro. In the present example illustrated in FIG. 9, the TPF macro is "ENTNC", which is denoted by dotted arrow 176A, starting at program "PRA2" and pointing to program "PRB1".

Segment flow analyzer module 28 then searches the macro table calling field program for program "PRE1". If one or more called programs are found in the macro table as called by program "PRE1", segment flow analyzer module 28 moves that program(s) to a temporary list for further flow tracing. Segment flow analyzer module 28 searches the macro table called program field for program(s) that are called by program "PRE1". In the present example (as illustrated in FIG. 9), program "PRB2" is called by program "PRE1". Segment flow analyzer module 28 assigns symbol 182A to program "PRE1" and displays symbol 182F along with program name "PRE1" in flowchart GUI 171. Segment flow analyzer module 28 also displays in flowchart GUI 171 an arrow indicating the flow of program "PRB2" to program "PRE1". The type of arrow displayed is dependent on the TPF macro. In the present example illustrated in FIG. 9, the TPF macro is "ENTNC", which is denoted by dotted arrow 176A, starting at program "PRB2" and pointing to program "PRE1".

Segment flow analyzer module 28 then searches the macro table calling field program for program "PRE1". If program "PRE1" is not found in the called field, then no program is called by program "PRE1" and this portion of the segment flow analysis ends. Symbol 182E may be changed to denote an end point (i.e., change color or shape).

Segment flow analyzer module 28 then searches the macro table calling field program for program "PRHA". If one or more called programs are found in the macro table as called by program "PRHA", segment flow analyzer module 28 moves that program(s) to a temporary list for further flow tracing. Segment flow analyzer module 28 searches the macro table called program field for program(s) that are called by program "PRHA". In the present example (as illustrated in FIG. 9), programs "PRB2" and "PRB1" are called by program "PRHA". Segment flow analyzer module 28 assigns symbol 178F to program "PRHA" and displays symbol 178F along with program name "PRHA" in flowchart GUI 171. Segment flow analyzer module 28 also displays in flowchart GUI 171 arrows indicating the flows of programs "PRB2" and "PRB1" to program "PRHA". The type of arrows displayed is dependent on the TPF macro. In the present example illustrated in FIG. 9, the TPF macros are both "ENTRC", which is denoted by solid arrows 176B, starting at program "PRB2" and pointing to program "PRHA" and starting at program "PRB1" and pointing to program "PRHA", respectively.

Segment flow analyzer module 28 then searches the macro table calling field program for program "YCD1". If one or more called programs are found in the macro table as called by program "YCD1", segment flow analyzer module 28 moves that program(s) to a temporary list for further flow tracing. Segment flow analyzer module 28 searches the macro table called program field for program(s) that are called by program "YCD1". In the present example (as illustrated in FIG. 9), program "PRHA" is called by program "YCD1". Segment flow analyzer module 28 assigns symbol 180 to program "YCD1" and displays symbol 180 along with program name "YCD1" in flowchart GUI 171. Segment flow analyzer module 28 also displays in flowchart GUI 171 arrows indicating the flow of program "PRB2" to program "YCD1". The type of arrow displayed is dependent on the TPF macro. In the present example illustrated in FIG. 9, the TPF macro is "ENTNC", which is denoted by dotted arrow 176A, starting at program "PRHA" and pointing to program "YCD1".

Segment flow analyzer module 28 then searches the macro table calling field program for program "PRE2". If one or more called programs are found in the macro table as called by program "PRE2", segment flow analyzer module 28 moves that program(s) to a temporary list for further flow tracing. Segment flow analyzer module 28 searches the macro table called program field for program(s) that are called by program "PRE2". In the present example (as illustrated in FIG. 9), program "PRE2" is called by program "PRE2". Segment flow analyzer module 28 assigns symbol 182B to program "PRE2" and displays symbol 182B along with program name "PRE2" in flowchart GUI 171. Segment flow analyzer module 28 also displays in flowchart GUI 171 arrows indicating the flow of program "PRHA" to program "PRE2". The type of arrow displayed is dependent on the TPF macro. In the present example illustrated in FIG. 9, the TPF macro is "ENTNC", which is denoted by dotted arrow 176A, starting at program "PRHA" and pointing to program "PRE2".

When segment flow analyzer module 28 has searched the macro table for all of the user-selected programs (including, in the example illustrated in FIG. 9, the user-selected start program "PRA0"), the segment flow analysis is complete and the final, complete segment flow full trace is displayed in flowchart GUI 171.

The following pseudocode details the operation of segment flow analyzer module 28. For the forward segment flow, the steps are:
Step 1:
Sort the macro table by "calling program" (first field);
Get the user-selected "start" program;
Move the user-selected "start" program to the first position in the forward trace report;
Search the macro table by "calling program" field using the user-selected "start" program;
If not found;
Stop processing—no further programs found for trace;
Else;
Get the "called program" and macro name from the table;
Move the "called program" to A temporary list for further processing;
Move the type of TPF ENTER macro and called program to the forward trace report;
End;
Step 2:
For each "called program" saved in the temporary list for further processing;
Search the macro table by "called program" in the "calling program" field;
If found;
Move the type of TPF MACRO and "called program" to the trace report;
Move the "called program" to temporary list for further processing"
Continue processing with start of Step 2;
Else;
Stop processing—no further programs found for forward trace;
End.
Graph generation.
Step 3:
Sort the macro table by "calling program" (first field);
Get the user-selected "start" program;
Search the macro table by "calling program" field using the user-selected "start" program;
If not found,
Stop processing—no graph generated as there is no flow;
Else,
Get the "called program" and macro name from the table;
Move the "called program" to a temporary list for further processing;
Create a graph with user-selected "start" program as the starting point and "called programs" as the end point(s);
Use the macro type for connecting the start and end programs of the graph;
End.
Step 4:
Select the first program (e.g., "called program"), in the temporary list for current processing;

Determine whether the selected program has been processed;
If the selected program has been processed,
Delete the selected program from the temporary list;
Continue processing (return to) start of step 4;
End.
Search the macro table using the selected program in the "calling program" field;
If the selected program is found,
Retrieve all "called programs" in the macro table;
Create a graph with the current search program as the starting point and "called programs" as end points;
Join the new graph created with matching start/end point of the existing graph;
Add the "called programs" to the bottom (i.e., end) of the temporary list for further processing;
End.
Delete the processed current program from the temporary list;
Indicate that this program has been processed;
Determine whether any program is present in the temporary list for processing;
If yes,
Continue processing at the start of Step 4;
Else,
Go to Step 5;
End.
Step 5:
Add heading (i.e., title, legend), and display graph in flowchart GUI 171.
For the comprehensive (and reverse) segment flow, the steps are:
Step 1 (identify driver programs (see FIG. 1)—programs that are not called by any other program);
Sort the macro table by "calling program" (first field);
Identify "calling program" which is not present in the "called program"
Move identified programs to a temporary list for further processing;
For each of the driver programs, identify the forward chains using step 2 and step 3;
Step 2:
Get the driver program name from the temporary list;
Move the driver program to the first program position in the comprehensive (or revere) trace report;
Search the macro table by "calling program" field using the driver program;
If not found;
Stop processing—no further programs found for comprehensive (or revere) trace;
Else;
Get the "called programs" and macro name from the table;
Move the "called programs" to a temporary list for further processing;
Move the type of macro and "called program" to the comprehensive (or revere) trace report;
End.
Step 3:
For each "called programs" saved in the temporary list for further processing;
Search the macro table by "called program" in the "called program" field;
If found;
Move the type of macro and "called program" to the comprehensive (or revere) trace report;
Move the "called program" to the temporary list for further processing;
Continue processing with start of step 3;
Else;
Stop processing—no further programs found for comprehensive (or revere) trace;
End.

Figure 8:
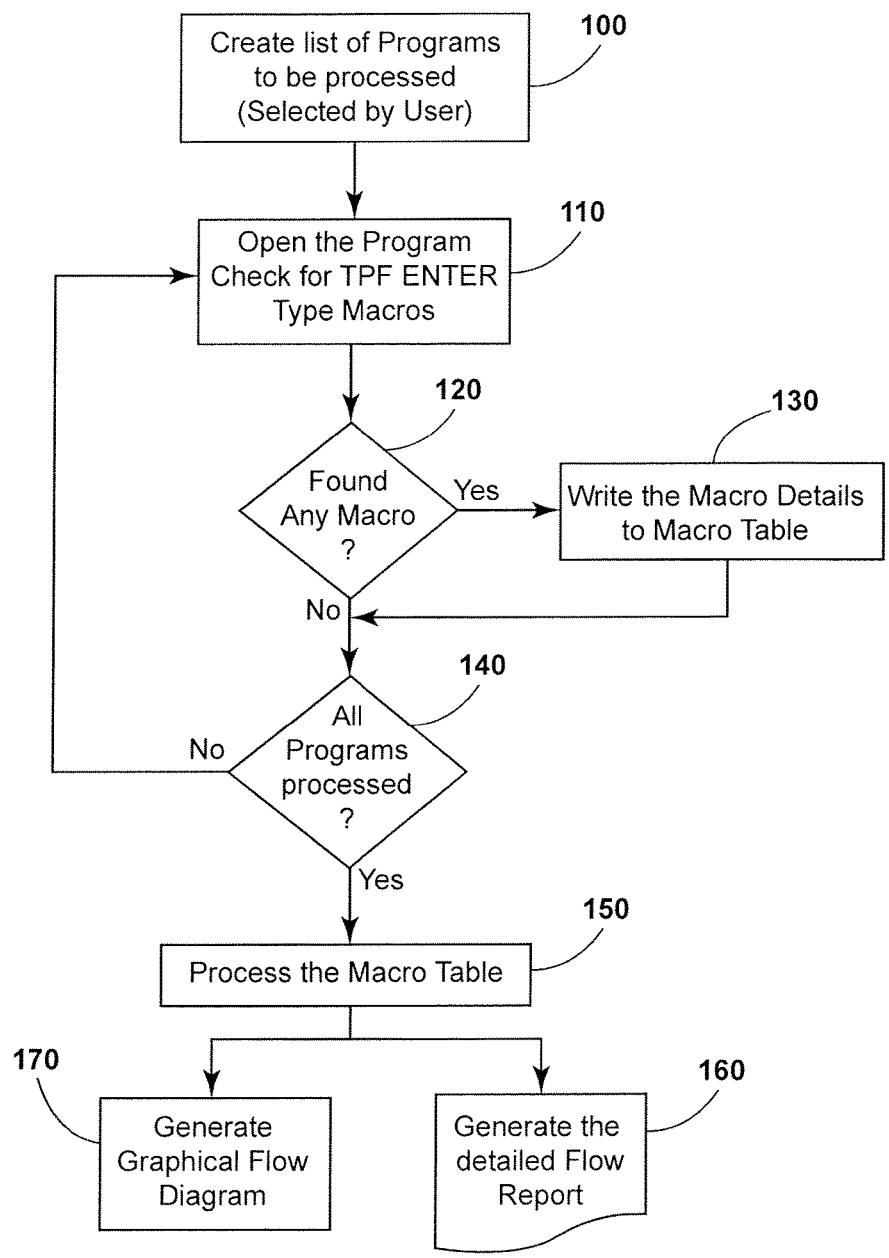
FIG. 8 is a flowchart for generating a comprehensive segment flow trace diagram in accordance with teaching of the present disclosure.

Comprehensive Flow Trace. FIG. 8 is a high-level flowchart illustrating, in an embodiment, the operation of a method of operation of the comprehensive trace option of segment flow analyzer 28 included in the larger assembler source analyzer module(s) 19. The method begins in step 100.

In step 100, a user creates a list of programs to be processed, such as, by using a drop-down menu in GUI 41 (as shown in FIG. 5). By default, all programs in the user selected source library will be displayed and automatically selected. The user has the option to select (or de-select) files based on the function, package, or program names. The user may also select/de-select any program manually by clicking on the check box designated for the program. The user executes the comprehensive trace option of segment flow analyzer 28. The method then moves to step 110.

In step 110, segment flow analyzer 28 opens a user selected program and checks the program for TPF "ENTER" type macros. The method then moves to step 120.

In step 120, segment flow analyzer 28 determines whether a TPF "ENTER" type macro is present in the user selected program. If YES, then the method moves to step 130. If NO, the method moves to step 140.

In step 130, segment flow analyzer 28 writes the TPF macro details to a macro table (as shown in FIG. 15) updating the macro table with the current program name, macro name, and called program name, then proceeds to step 140.

In step 140, segment flow analyzer 28 determines if all user selected programs have been processed. If NO, the method returns to step 110. If YES, the method moves to step 150.

In step 150, segment flow analyzer 28 processes the macro table (as shown in FIG. 15) written to in step 130. The trace status is updated to "traced" against each user selected program if the program has at least one TPF "ENTER" macro call or the program is called by at least one other program (as shown in FIG. 14). The segment flow analyzer 28 sorts the macro table based on the first field and gets the details of the second and third fields. Additionally, the segment flow analyzer 28 sorts the macro table on the third field and gets the details of the first and second field (e.g., see FIG. 15). For programs that do not have calls—the segment flow analyzer 28 will determine that no "ENTER" TPF macro is found for those programs and those programs will not be traced. Those programs will be denoted in the configuration file for being not found in the source library. The segment flow analyzer 28 processes all of the items in the macro table that is used to create a detailed output report in text format in step 160 and a graphical flow diagram in step 170.

FIG. 9 is a graphical flowchart representing a comprehensive segment flow trace performed by the segment flow analyzer 28 and requested by a user via selection bar 42 and graph generator button 49 provided in GUI 41. In the graphical report, colors or other representations (e.g., cross-hatching and/or symbols), may be used to indicate the following:
Green/circle—first/starting/driving program;
Yellow/triangle—intermediate program;
Red/hexagon—last program in the flow;

Pink/square—end program selected by user for reverse flow trace; and

Gray/rhombus—this program could not be traced further (i.e., either specified in configuration file or not found in the library).

Additionally, the graphical report shows the immediate program calls for any program traced in the flow. The graphical report with immediate program calls is generated when user double clicks on the "trace status" column against the program via the GUI.

Flowchart GUI 171 is generated and displayed to the user graphically illustrating a comprehensive segment flow trace. Flowchart GUI 171 includes a legend 172, which in FIG. 9 includes an arrow 176A in a first color or style (e.g., red, dotted line), representing the flow of assembler macro "ENTNC" and an arrow 176B in a second color or style (e.g., blue, solid line), representing the flow of assembler macro "ENTRC". A third color or style (e.g., light blue, dashed line), represents the flow of both assembler macros "ENTRC" and "ENTNC". It should be understood that additional types and/or styles of legend may be included in segment flow analyzer 28. The selected start program 174 "PRA0" is shown (represented by a circle). Arrow 176A indicates the flow from program 174 "PRA0" to intermediate program 178A "PRA1" (represented by a triangle) and indicates that the assembler macro is "ENTNC". Arrow 176A and arrow 176B indicates the flow from intermediate program 178A to intermediate programs 178B "PRMU" and 178C "PRA2" (both represented by triangles), denoting assembler macros "ENTNC" and "ENTRC", respectively. From intermediate program 178B "PRMU" (represented by a triangle) the flow continues to intermediate program 178D "PRB2" (represented by a triangle) with arrow 176B denoting assembler macro "ENTRC". From intermediate program 178C "PRA2" (represented by a triangle) the flow continues to intermediate program 178E "PRB1" (represented by a triangle) with arrow 176A denoting assembler macro "ENTNC". From intermediate program 178D, arrow 176A indicates the flow to an end program 182A "PRE1"(represented by a hexagon) and arrow 176A indicates the flow to intermediate program 178F "PRHA" (represented by a triangle), denoting assembler macros "ENTNC" and "ENTRC", respectively. From intermediate program 178E "PRB1" the flow continues to intermediate program 178F "PRHA". Arrows 176A indicate the flows from intermediate program 178F "PRHA" to program 180 "YCD1" (represented by a rhombus) which cannot be traced further and end program 182B "PRE2" (represented by a hexagon), completing the comprehensive flow trace.

Figure 10:
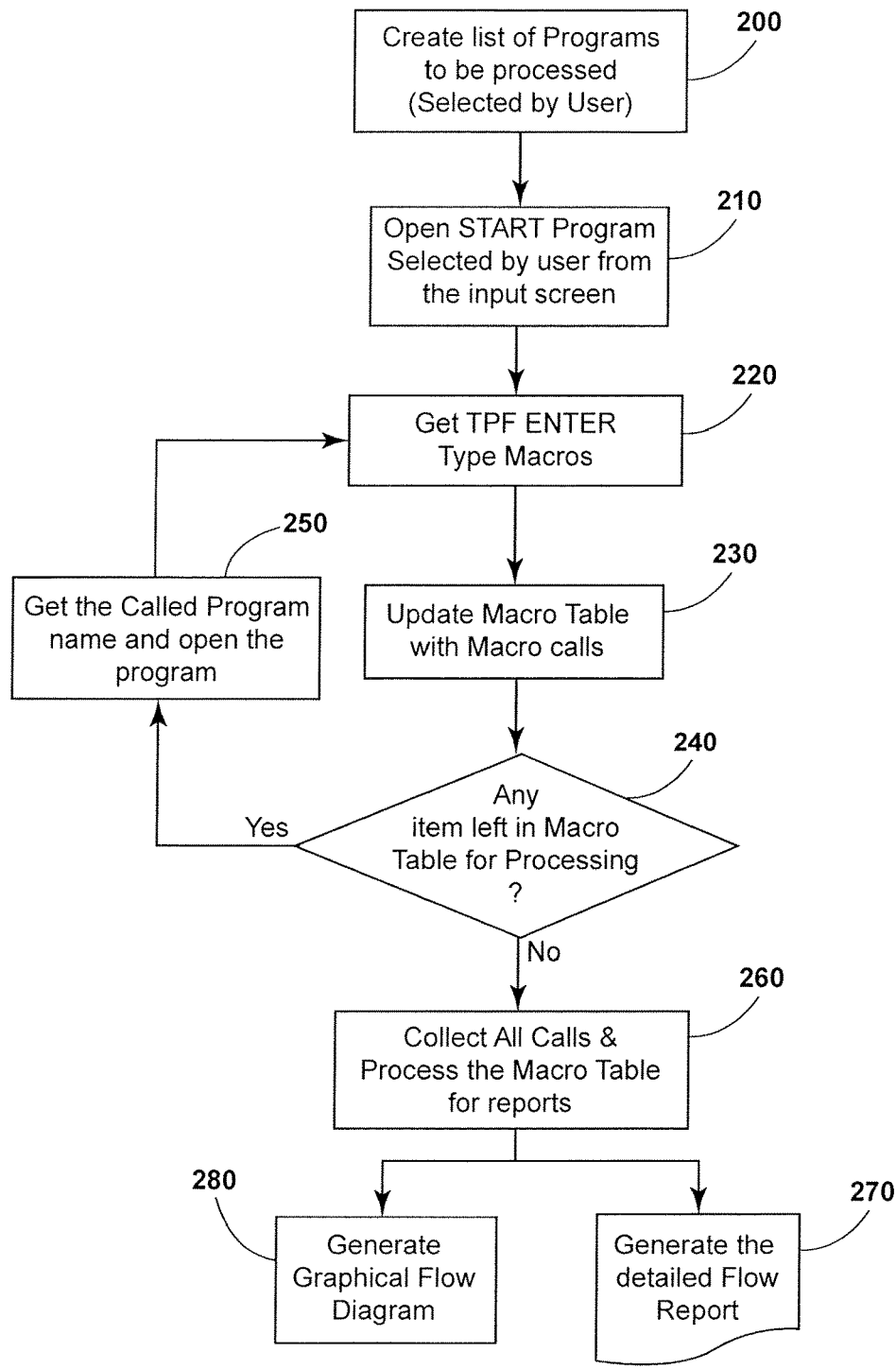
FIG. 10 is a flowchart for generating a forward segment flow trace diagram according to an embodiment of the disclosure in accordance with teachings of the present disclosure.

Forward Flow Trace. FIG. 10 is a high-level flowchart illustrating, in an embodiment, the operation of a method of operation of the forward trace option of segment flow analyzer 28 included in the larger assembler source analyzer module(s) 19. The method begins in step 200.

In step 200, a user creates a list of programs to be processed, such as, by using a drop-down menu in GUI 41 (as shown in FIG. 5). By default, all programs in the user selected source library will be displayed and automatically selected. The user has the option to select (or de-select) files based on the function, package, or program names. The user may also select/de-select any program manually be clicking on the check box designated for the program. The user executes the forward trace option of segment flow analyzer (SFH) 28. The method then moves to step 210.

In step 210, SFH 28 opens a user selected program and checks whether the "START" program exists in the configuration file for the trace exclusion. If the "START" program exists, an error message is displayed to the user via GUI 41 as no forward chain exists for this "START" program. If the "START" program does not exist, segment flow analyzer 28 opens the "START" program. The method then moves to step 220.

In step 220, SFH 28 parses the user selected program for TPF macros and checks for "ENTER" type macros. The method then moves to step 230.

In step 230, SFH 28 updates the macro table (as shown in FIG. 15) with the current program name, macro name, and called program name. The method then moves to step 240.

In step 240, SFH 28 checks to determine if any item/entry exists in the macro table for processing. If YES, the method proceeds to step 250. In NO, the method proceeds to step 260.

In step 250, SFH 28 gets the called program name and checks to determine whether this program exists in the configuration file for trace exclusion. If the program exists in the configuration file, SFH 28 skips the program and continues to the next item. If the program does not exist in the configuration file, SFH 28 opens the program and proceeds to the start of the process program.

In step 260, SFH 28 collects all program calls and processes the macro table for report generation. SFH 28 updates the trace status as "traced" against each user selected program if the program is in the flow (as shown in FIG. 14). SFH 28 processes all the items in the macro table according to the following logic. For the complete list of segments in the flow, all programs in the flow are processed (i.e., items in the macro table). For segment calls, the list of programs in the flow that are called by them. For segments called by, the list of programs in the flow that are called by with details of calling programs. For segments not proceed, programs in the flow but not found in the library or not selected by the user or specified in the configuration file for exclusion. For segments ignored, programs ignored because of indicator in configuration file for ignoring. The method then proceeds to step 270 for generation of a text report and step 280 for a generation of a graphical flow diagram (as shown in FIG. 11).

FIG. 11 is a graphical flowchart representing a forward segment flow trace performed by the segment flow analyzer 28 and requested by a user via selection bar 42 and graph generator button 49 provided in GUI 41. Flowchart GUI 171 is generated and displayed to the user graphically illustrating a forward segment flow trace. Flowchart GUI 171 includes a legend 172, which includes arrow 176A in a first color or style (e.g., red, dotted line), representing the flow of assembler macro "ENTNC" and arrow 176B in a second color or style (e.g., blue, solid line), representing the flow of assembler macro "ENTRC". A third color or style (e.g., light blue, dashed line), represents the flow of both assembler macros "ENTRC" and "ENTNC". It should be understood that additional types and/or styles of legend may be included in segment flow analyzer 28.

The start program 174 "PRA0" is shown (represented by a circle). Arrow 176A indicates the flow from program 174 "PRA0" to intermediate program 178A "PRA1" (represented by a triangle) and indicates that the assembler macro is "ENTNC". Arrow 176A and arrow 176B indicates the flows from intermediate program 178A to intermediate programs 178B "PRMU" and 178C "PRA2" (both represented by triangles), denoting assembler macros "ENTNC" and "ENTRC", respectively. From intermediate program 178B "PRMU" the flow continues to intermediate program 178D "PRB2" (represented by a triangle) with arrow 176B denoting assembler macro "ENTRC". From intermediate program 178C "PRA2" the flow continues to intermediate program 178E "PRB1" (represented by a triangle) with arrow 176A denoting assembler macro "ENTNC" and to program "180A" "UCDR" (represented by a rhombus) which cannot be traced further with arrow 176B denoting assembler macro "ENTRC". From intermediate program 178E "PRB1" the flow continues to intermediate program 178F "PRHA" (represented by a triangle) with arrow 176B, denoting assembler macro "ENTRC". From intermediate program 178F "PRHA" the flow continues to program 180B "NGA1" (represented by a rhombus) which cannot be traced further with arrow 176A, denoting "ENTNC" and to end program 182B "PRE2" (represented by a hexagon) with arrow 176A denoting "ENTNC", completing the forward flow trace.

Figure 12:
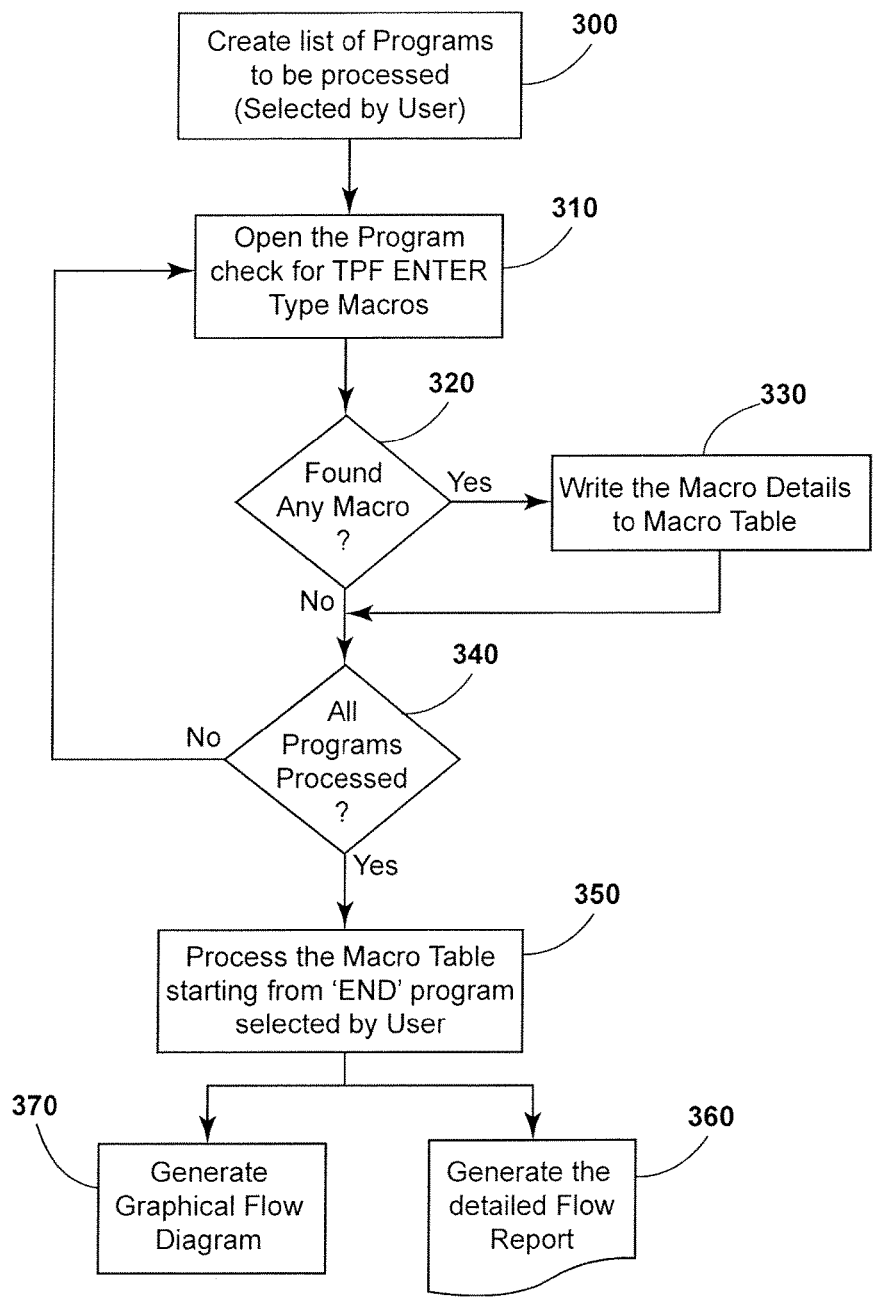
FIG. 12 is a flowchart for generating a reverse segment flow trace diagram in accordance with teachings of the present disclosure.

Reverse Flow Trace. FIG. 12 is a high-level flowchart illustrating the reverse trace option implemented using the comprehensive trace design concept of segment flow analyzer 28 included in the larger assembler source analyzer module(s) 19. The method begins in step 300.

In step 300, a user creates a list of programs to be processed, such as, by using a drop-down menu in GUI 41 (as shown in FIG. 5). By default, all programs in the user selected source library will be displayed and automatically selected. The user has the option to select (or de-select) files based on the function, package, or program names. The user may also select/de-select any program manually by clicking on the check box designated for the program. The user executes the reverse trace option of segment flow analyzer 28. The method then moves to step 310.

In step 310, segment flow analyzer 28 opens a user selected program and checks the program for TPF "ENTER" type macros. The method then moves to step 320.

In step 320, segment flow analyzer 28 determines whether a TPF "ENTER" type macro is present in the user selected program. If YES, then the method moves to step 330. If NO, the method moves to step 340.

In step 330, segment flow analyzer 28 writes the TPF macro details to a macro table (as shown in FIG. 15), updating the macro table with the current program name, macro name, and called program name, then proceeds to step 340.

In step 340, segment flow analyzer 28 determines if all user selected programs have been processed. If NO, the method returns to step 310. If YES, the method moves to step 350.

In step 350, segment flow analyzer 28 processes the macro table written to in step 330. The macro table is processed starting from the "END" program selected by the user. The trace status is updated to "traced" against each user selected program if the program has at least one TPF "ENTER" macro call or the program is called by at least one other program (as shown in FIG. 14). The segment flow analyzer 28 sorts the macro table based on the first field and gets the details of the second and third fields. Additionally, the segment flow analyzer 28 sorts the macro table on the third field and gets the details of the first and second field. For programs that do not have calls—the segment flow analyzer 28 will determine that no "ENTER" macro is found for those programs and those programs will not be traced. Those programs will be denoted in the configuration file for being not found in the source library. The segment flow analyzer 28 processes all of the items in the macro table that is used to create a detailed output report in text format in step 360 and a graphical flow diagram in step 370.

Additionally, SFH 28 generates the macro table with all "ENTER" macros using the same logic as used in the comprehensive trace and is processed to get the reverse flow ending to the user specified program. This is indicated in the macro table (as shown in FIG. 15) and this updated information is used to generate the output report and graphical flow diagram. SFH 28 gets a list of all selected by the user from the screen. SFH 28 generates a macro table as described above in the comprehensive trace option. Additionally, for the reverse trace option, SFH 28 searches for the "END" program in the called program field of the macro table (third field). If the "END" program is not found, SFH 28 displays an error message to the user via GUI 41 that the program is not called by any other program (i.e., no reverse flow exists). If the "END" program is found, SFH 28 gets the program name of the calling program (first field in the macro table) and marks this item in the macro table for final processing.

Additionally, for the reverse trace option, SFH 28 checks whether this program is present in the called field of the macro table (third field). If the program is not found, SFH 28 processes the updated macro table (tracing over and no more backward chains available). If the program is found, SFH 28 gets the program name of the calling program (first field in the macro table), marks this item in the macro table for final processing, and continues searching using this program. At this point, all programs in the reverse flow are marked in the macro table.

Additionally, SFH 28 processes the updated macro table for generating the text report and the graphical flow diagram. SFH 28 updates the trace status as "traced" against each user selected program if the program is in flow. SFH 28 processes all of the items in the macro table and creates the output reports. SFH 28 processes all the items in the macro table according to the following logic. For the complete list of segments in the flow, all programs in the flow are processed (marked in the macro table). For segment calls, the list of programs in the flow that are called by them. For segments called by, the list of programs in the flow that are called by with details of calling programs. For segments not proceed, programs in the flow but not found in the library or not selected by the user or specified in the configuration file for exclusion. For segments ignored, programs ignored because of indicator in configuration file for ignoring. SFH 28 then generates the link map of the programs that are connected in the flow and create the graphical diagram showing the flow details (as shown in FIG. 13).

FIG. 13 is a graphical flowchart representing a reverse segment flow trace performed by the segment flow analyzer 28 and requested by a user via selection bar 42 and graph generator button 49 provided in GUI 41 (as shown in FIG. 5). A flowchart GUI 171 is generated and displayed to the user graphically illustrating a reverse segment flow trace. Flowchart GUI 171 includes a legend 172, which includes arrow 176A in a first color or style (e.g., red, dotted line), representing the flow of assembler macro "ENTNC" and arrow 176B in a second color or style (e.g., blue, solid line), representing the flow of assembler macro "ENTRC". A third color or style (e.g., light blue, dashed line), represents the flow of both assembler macros "ENTRC" and "ENTNC". It should be understood that additional types and/or styles of legend may be included in segment flow analyzer 28.

The start program 174 "PRA0" is shown (represented by a circle). Arrow 176A indicates the flow from program 174 "PRA0" to intermediate program 178A "PRA1" (represented by a triangle) and indicates the assembler macro "ENTNC". Arrow 176A and arrow 176B indicates the flows from intermediate program 178A "PRA1" to intermediate programs 178B "PRMU" and 178C "PRA2" (both represented by triangles), denoting assembler macros "ENTNC" and "ENTRC", respectively. From intermediate program 178B "PRMU" the flow continues to intermediate program 178D "PRB2" (represented by a triangle) with arrow 176B denoting assembler macro "ENTRC". From intermediate program 178C "PRA2" the flow continues to intermediate program 178E "PRB1" (represented by a triangle) with arrow 176A denoting assembler macro "ENTNC". From intermediate program 178D "PRB2" arrow 176B indicates the flow to intermediate program 178F "PRHA" (represented by a triangle), denoting assembler macro "ENTRC". From intermediate program 178E "PRB1" the flow continues to intermediate program 178F "PRHA". From intermediate program 178F "PRHA" arrow 176A indicates the flow to end program 182B "PRE2" (represented by a square), which is the end program selected by the user via GUI 41, completing the reverse flow trace.

Tool Operating Environment. The segment flow analyzer module (SFH) 28 is developed using JAVA and needs Java Development Kit (JDK) 1.6/Java Runtime Environment (JRE) 1.6 environment to function. Additionally, SFH 28 may operate on a platform comprising operating system Microsoft Windows 7, 32-bit. The Java Archive (JAR) file of SFH 28 can be installed in any user directory.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that a system 16, particularly a main electronic control unit (i.e., processor 17), as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the assembler source code analyzer logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computerized method for analysis of the flow of assembler source programs, the method comprising the steps of:
  providing assembler source programs collectively constituting a function;
  parsing, using a computer, the content of each of the assembler source programs to identify each occurrence of control transfer assembler macros that call to and/or from another assembler program in the assembler source programs;
  collecting, using a computer, the identified control transfer assembler macros by storing the identified control transfer assembler macros in a macro table including a respective identification of a calling assembler program and a called assembler program;
  associating, using a computer, each assembler macro with a respective comprehensive, forward, and reverse flow that identifies at least another assembler macro, and storing the association in the macro table such that each assembler macro of the assembler macros in the macro table has at least one of a comprehensive, forward, and reverse flow;
  receiving an input indicative of a starting or ending assembler program and one of a comprehensive, a forward, and a reverse control transfer flow to thereby select a desired output flow;
  tracing, using a computer, the desired output flow based on the received input and the macro table; and
  generating, using a computer, a graphical display and/or a text report of the starting or ending assembler program and one of a comprehensive, a forward, and a reverse control transfer flow based on the received input and the macro table.

2. The method of claim 1, wherein the parsing further comprises analyzing, using a computer, a first assembler macro of the assembler macros to determine if the first assembler macro calls to and/or from at least one of the assembler source programs.

3. The method of claim 2, wherein the storing further comprises updating the macro table according to the determination.

4. The method of claim 2, wherein the analyzing further comprises analyzing the first assembler macro to identify the assembler source programs that call to and/or from the first assembler macro.

5. The method of claim 1, wherein the parsing further comprises analyzing, using a computer, a second assembler macro of the assembler macros to determine if the second assembler macro calls to and/or from at least one of the assembler source programs.

6. The method of claim 2, wherein the analyzing further comprises analyzing the second assembler macro to identify the assembler source programs that call to and/or from the second assembler macro.

7. The method of claim 1, wherein the storing further comprises updating the macro table with the assembler programs that do not include at least one of the assembler macros.

8. The method of claim 1, further comprising sorting, using a computer, the assembler macros in the macro table according to the assembler programs that call to and/or from the plurality of assembler macros.

9. The method of claim 8, wherein the storing further comprises updating the macro table according to the sorting.

* * * * *